(12) United States Patent
Sallee et al.

(10) Patent No.: US 11,669,724 B2
(45) Date of Patent: Jun. 6, 2023

(54) MACHINE LEARNING USING INFORMED PSEUDOLABELS

(71) Applicant: Raytheon Company, Waltham, MA (US)

(72) Inventors: Philip A. Sallee, South Riding, VA (US); James Mullen, Leesburg, VA (US); Franklin Tanner, Ashburn, VA (US)

(73) Assignee: Raytheon Company, Waltham, MA (US)

( * ) Notice: Subject to any disclaimer, the term of this patent is extended or adjusted under 35 U.S.C. 154(b) by 996 days.

(21) Appl. No.: 16/413,730

(22) Filed: May 16, 2019

(65) Prior Publication Data

US 2019/0354857 A1 Nov. 21, 2019

Related U.S. Application Data

(60) Provisional application No. 62/810,113, filed on Feb. 25, 2019, provisional application No. 62/672,758, filed on May 17, 2018.

(51) Int. Cl.
*G06N 3/08* (2023.01)
*G06N 3/04* (2023.01)

(52) U.S. Cl.
CPC ............... *G06N 3/08* (2013.01); *G06N 3/04* (2013.01)

(58) Field of Classification Search
CPC ..................................................... G06N 3/08
See application file for complete search history.

(56) References Cited

U.S. PATENT DOCUMENTS

| | | | |
|---|---|---|---|
| 6,681,054 B1 * | 1/2004 | Gindele | ............ G06T 5/20 382/254 |
| 8,571,271 B2 | 10/2013 | Yuan et al. | |
| 8,600,108 B2 | 12/2013 | Tang et al. | |
| 9,275,308 B2 | 3/2016 | Szegedy et al. | |
| 9,418,319 B2 | 8/2016 | Shen et al. | |
| 9,424,493 B2 | 8/2016 | He et al. | |
| 9,514,389 B1 | 12/2016 | Erhan et al. | |

(Continued)

FOREIGN PATENT DOCUMENTS

AU    2019203471 B2    11/2020

OTHER PUBLICATIONS

Jiang et. al., "A Hybrid Generative/Discriminative Method for Semi-Supervised Classification", 2012 (Year: 2012).*

(Continued)

*Primary Examiner* — Omar F Fernandez Rivas
*Assistant Examiner* — Selene A. Haedi
(74) *Attorney, Agent, or Firm* — Scwhegman Lundberg & Woessner, P.A.

(57) ABSTRACT

Subject matter regards improving machine learning techniques using informed pseudolabels. A method can include receiving previously assigned labels indicating an expected classification for data, the labels having a specified uncertainty, generating respective pseudolabels for the data based on the previously assigned labels, the data, a class vector determined by an ML model, and a noise model indicating, based on the specified uncertainty, a likelihood of the previously assigned label given the class, and substituting the pseudolabels for the previously assigned labels in a next epoch of training the ML model.

10 Claims, 16 Drawing Sheets

(56) References Cited

U.S. PATENT DOCUMENTS

| | | |
|---|---|---|
| 9,542,626 B2 | 1/2017 | Martinson et al. |
| 9,965,719 B2 | 5/2018 | Choi et al. |
| 10,109,052 B2 | 10/2018 | Chefd'hotel et al. |
| 10,304,193 B1 | 5/2019 | Wang et al. |
| 10,489,635 B2 | 11/2019 | Tan |
| 10,671,875 B2 | 6/2020 | Yamamoto et al. |
| 10,699,421 B1 | 6/2020 | Cherevatsky et al. |
| 11,068,747 B2 | 7/2021 | Goldstein et al. |
| 2004/0017930 A1 | 1/2004 | Kim et al. |
| 2008/0166045 A1 | 7/2008 | Xu et al. |
| 2009/0034805 A1 | 2/2009 | Perlmutter et al. |
| 2011/0160543 A1 | 6/2011 | Parsey et al. |
| 2011/0254950 A1 | 10/2011 | Bibby et al. |
| 2012/0121132 A1 | 5/2012 | Asahara et al. |
| 2012/0201464 A1 | 8/2012 | Fukui et al. |
| 2012/0301024 A1 | 11/2012 | Yuan et al. |
| 2012/0327188 A1 | 12/2012 | Takemura et al. |
| 2014/0072170 A1 | 3/2014 | Zhang et al. |
| 2015/0278601 A1 | 10/2015 | Nagamine et al. |
| 2016/0026848 A1 | 1/2016 | Hamid et al. |
| 2016/0196665 A1 | 7/2016 | Abreu et al. |
| 2016/0224833 A1 | 8/2016 | Jin |
| 2017/0011077 A1* | 1/2017 | Kypreos ............... G06Q 40/00 |
| 2017/0147905 A1 | 5/2017 | Huang et al. |
| 2017/0169567 A1 | 6/2017 | Chefd'hotel et al. |
| 2017/0228871 A1* | 8/2017 | Mnih ................... G06K 9/6269 |
| 2017/0316285 A1 | 11/2017 | Ahmed et al. |
| 2018/0032038 A1* | 2/2018 | Kang ..................... G06N 20/00 |
| 2018/0096261 A1* | 4/2018 | Chu ....................... G06N 20/20 |
| 2018/0150728 A1* | 5/2018 | Vahdat ................ G06N 3/0472 |
| 2018/0211130 A1 | 7/2018 | Jiang |
| 2018/0300576 A1* | 10/2018 | Dalyac ................... G06N 20/00 |
| 2019/0102646 A1* | 4/2019 | Redmon ............... G06V 20/52 |
| 2019/0130220 A1* | 5/2019 | Zou ..................... G05D 1/0088 |
| 2019/0138946 A1* | 5/2019 | Asher ..................... G06N 5/04 |
| 2019/0228318 A1 | 7/2019 | Kwant et al. |
| 2019/0370551 A1 | 12/2019 | Mao et al. |
| 2019/0392268 A1 | 12/2019 | Tariq et al. |
| 2020/0267373 A1 | 8/2020 | Jian |
| 2020/0412937 A1 | 12/2020 | Huang |
| 2021/0097345 A1 | 4/2021 | Goldstein et al. |

OTHER PUBLICATIONS

Lee, "Pseudo-Label: The Simple and Efficient Semi-Supervised Learning Method for Deep Neural Networks", 2013 (Year: 2013).*

Bachman et. al., "Learning with Pseudo-Ensembles", 2014 (Year: 2014).*

Xu et. al., "Co-Labeling for Multi-View Weakly Labeled Learning", 2016 (Year: 2016).*

Zhang et. al., "Unsupervised Deep Hashing with Pseudo Labels for Scalable Image Retrieval", Apr. 2018 (Year: 2018).*

Tanaka et. al., "Joint Optimization Framework for Learning with Noisy Labels", Mar. 2018 (Year: 2018).*

Wang et al., "Interactive deep learning method for segmenting moving objects", 2017 (Year: 2017).*

Russell et al., "LabelMe: A Database and Web-Based Tool for Image Annotation", 2007 (Year: 2007).*

"Imagenet", Stanford University Vision Lab, Accessed from Internet on Nov. 9, 2018 http://www.image-net.org/, (2018), 1 pg.

"Receiver operating characteristic", Wikipedia, [Online]. Retrieved from the Internet: <URL: https://en.wikipedia.org/wiki/Receiver_operating_characteristic>, (Accessed Dec. 2, 2019), 9 pgs.

"Softmax Cross Entropy", Google Authors, [Online]. Retrieved from the Internet: <URL: https://www.tensorflow.org/versions/r1.15/api_docs/python/tf/losses/softmax_cross_entropy>, (2019), 2 pgs.

"Tf.keras.applications.VGG16: TensorFlow Core r2.0", Creative Commons Attribution 4.0 License, [Online]. Retrieved from the Internet: <URL: https://www.tensorflow.org/api_docs/python/tf/keras/applications/VGG16>, (Accessed Dec. 2, 2019), 1 pg.

"Transfer learning", Wikipedia, [Online]. Retrieved from the Internet: <URL: https://en.wikipedia.org/wiki/Transfer_learning>, (Accessed Dec. 2, 2019), 3 pgs.

Abadi, Martin, et al., "Tensorflow: a system for large-scale machine learning.", 12th USENIX Symposium on Operating Systems Design and Implementation., (2016), 265-283.

Angluin, D., et al., "Learning from noisy examples", Machine Learning, 2(4)., (1988), 343-370.

Beigman, E, et al., "Learning with annotation noise", in Proceedings of the Joint Conference of the 47th Annual Meeting of the ACL and the 4th International Joint Conference on Natural Language Processing of the AFNLP, vol. 1, (2009), 280-287.

Bradley, Andrew, "The Use of the Area Under the ROC Curve in the Evaluation of Machine Learning Algorithms", in the Journal of Pattern Recognition, vol. 30, No. 7, (1997), 1145-1159.

Brodley, Carla, et al., "Identifying Mislabeled Training Data", Journal of Artificial Intelligence Research 11, (1999), 131-167.

Bylander, Tom, "Learning linear threshold functions in the presence of classification noise", Proceedings of the seventh annual conference on Computational learning theory, (1994), 340-347.

Clark, Alex, "Pillow (PIL Fork) Documentation, Release 6.2.1", (2019), 203 pgs.

Deng, J., et al., "ImageNet: A Large-Scale Hierarchical Image Database", IEEE Computer Vision and Pattern Recognition, (2009), 248-255.

Dutt Jain, S, "Predicting sufficient annotation strength for interactive foreground segmentation", Proceedings of the IEEE International Conference on Computer Vision, (2013), 1313-1320.

Grandvalet, Yves, et al., "Entropy Regularization", Semi-supervised learning, MIT Press, (2006), 151-168.

Hunter, John, "Matplotlib: A 2D graphics environment", Computing in science & engineering, 9(3), (2007), 90-95.

Iandola, F. N., "Squeezenet: Alexnet-level accuracy with 50x fewer parameters and < 0.5 mb model size", arXiv:1602.07360v4 [cs.CV] Nov. 4, 2016, (2016), 13 pgs.

Israel, Steven, et al., "ECG to identify individuals", Pattern Recognition 38(1), (2005), 133-142.

Israel, Steven, et al., "Fusing face and ECG for personal identification", Applied Imagery Pattern Recognition Workshop Proceedings,32nd, (2003), 226-231.

Israel, Steven, "Performance metrics: how and when" Geocarto International, vol. 21, No. 2, (2006), 23-32.

Jindal, I, "Learning deep networks from noisy labels with dropout regularization", Data Mining (ICDM),, (2016), 967-972.

Krizhevsky, A., et al., "ImageNet classification with deep convolutional neural networks", Advances in Neural Information Processing Systems, 25(2), (2012), 1097-1105.

Krizhevsky, Alex, "Learning Multiple Layers of Features from Tiny Images", in Technical Report of University of Toronto, (Apr. 8, 2009), 1-60.

Larsen, Jan, et al., "Design of Robust Neural Network Classifiers", Proceedings of the 1998 IEEE International Conference on, vol. 2, (1998), 1205-1208.

Lawrence, N D, "Estimating a kernel fisher discriminant in the presence of label noise", ICML, vol. 1, (2001), 306-313.

Lecun, Y, et al., "The MNIST Database of handwritten digits", [Online]. Retrieved from the Internet: <URL: http://yann.lecun.com/exdb/mnist/>, (Accessed Nov. 18, 2019), 7 pgs.

Lee, Dong-Hyun, "Pseudo-label: The simple and efficient semi-supervised learning method for deep neural networks", Workshop on Challenges in Representation Learning, ICML. vol. 3, (2013), 6 pgs.

Li, Yuncheng, et al., "Learning from Noisy Labels with Distillation", IEEE International Conference on Computer Vision, (2017), 9 pgs.

Liu, Wei, et al., "SSD: Single Shot MultiBox Detector", CVPR, arXiv:1512.02325v5 [cs.CV] Dec. 29, 2016, (2016), 17 pgs.

Markidis, S, "INVIDIA Tensor Core Programmability, Performance & Precision", arXiv:1803.04014v1, (2018), 12 pgs.

Metzen, J H, et al., "On detecting adversarial perturbations", International Conference on Learning Representations, (2017), 12 pgs.

Metzen, J H, et al., "Universal adversarial perturbations against semantic image segmentation", arXiv:1704.05712v3, (2017), 17 pgs.

(56) References Cited

OTHER PUBLICATIONS

Mnih, V, et al., "Learning to Label Aerial Images from Noisy Data", Proceedings of the 29th International Conference on Machine Learning (ICML-12), (2012), 567-574.

Moosavi-Dezfooli, Seyed-Mohsen, et al., "Universal adversarial perturbations", Computer Vision and Pattern Recognition. IEEE. arXiv:1610.08401v3 [cs.CV], (2017), 11 pgs.

Mullen, James, et al., "Comparing the Effects of Annotation Type on Machine Learning Detection Performance", IEEE Conference on Computer Vision and Pattern Recognition Workshops, (2019), 7 pgs.

Natarajan, N, et al., "Learning with Noisy Labels", Advances in neural information processing systems, (2013), 1196-1204.

Nigam, Kamal, et al., "Analyzing the Effectiveness and Applicability of Co-training", Proceeding of the Ninth International Conference on Information and Knowledge Manangement, (Nov. 2000), 8 pgs.

Papernot, Nicolas, et al., "Distillation as a Defense to Adversarial Perturbations Against Deep Neural Networks", 37th IEEE Symposium on Security & Privacy, (2016), 582-597.

Reed, S. E., et al., "Training Deep Neural Networks on Noisy Labels with Bootstrapping", arXiv:1412.6596v3 [cs.CV], (2014), 1-11.

Rolnick, David, et al., "Deep learning is robust to massive label noise", arXiv:1705.10694v1, (2017), 10 pgs.

Rosenberg, C, et al., "Semi-supervised seif-training of object detection models.", Proceedings of the Seventh IEEE Workshop on Applications of Computer Vision, vol. 1, (2005), 8 pgs.

Ruder, S, "An overview of gradient descent optimization algorithms", arXiv preprint arXiv:1609.04747., (2017), 14 pgs.

Sermanet, Pierre, et al., "Overfeat: Integrated recognition, localization and detection using convolutional networks", arXiv preprin tarXiv, (2013), 16 pgs.

Simard, et al., "Best Practices for Convolutional Neural Networks applied to Visual Document Analysis", in Proceedings of the Seventh International Conference on Document Analysis and Recognition, vol. 2, (2003), 6 pgs.

Simonyan, Karen, et al., "Very Deep Convolutional Networks for Large-Scale Image Recognition.", ICLR 2015, arXiv:1409.1556, (Apr. 10, 2015), 14 pgs.

Srivastava, N., et al., "Dropout a Simple Way to Prevent Neural Networks from Overfitting", in Journal of Machine Learning Research, 15(1), (Jan. 2014), 1929-1958.

Sukhbaatar, S., et al., "Learning from noisy labels with deep neural networks.", arXiv preprint arXiv:1406.2080, (2014), 1-10.

Tanner, Franklin, et al., "Overhead Imagery Research Data Set—an annotated data library and tools to aid in the development of computer vision algorithms", IEEE Applied Imagery Pattern Recognition Workshop, (2009), 1-8.

Woods, Kevin, et al., "Generating ROC curves for artificial neural networks", EEE Transactions on Medical Imaging, vol. 16, No. 3,, (Jun. 1997), 329-337.

Xiao, Tong, et al., "Learning from Massive Noisy Labeled Data for Image Classi?cation", in CVPR, (2015), 2691-2699.

Zhao, Zhong-Qiu, "Object Detection with Deep Learning: A Review", IEEE Transactions on Neural Networks and Learning Systems. arXiv:1807.05511v2 [cs.CV] (2019), 21 pgs.

Zhu, X, et al., "Class noise vs. attribute noise: A quantitative study", Artificial Intelligence Review, 22, (2004), 177-210.

"U.S. Appl. No. 16/586,480, Notice of Allowance dated Mar. 22, 2021", 12 pgs.

"Australian Application Serial No. 2019203471, First Examination Report dated Apr. 9, 2020", 6 pgs.

"Australian Application Serial No. 2019203471, Response filed Jun. 23, 2020 to First Examination Report, dated Apr. 9, 2020", 67 pgs.

Bekker, A J, et al., "Training deep neural-networks based on unreliable labels", IEEE International Conference on Acoustics, Speech and Signal Processing (ICASSP), Shanghai, (2016), 2682-2686.

\* cited by examiner

MACHINE LEARNING USING INFORMED PSEUDOLABELS

RELATED APPLICATION

This application claims the benefit of priority to U.S. Provisional Patent Application Ser. No. 62/672,758, filed on May 17, 2018, and titled "Deep Learning with Noisy Labels Using Informed Pseudolabels", and U.S. Provisional Patent Application Ser. No. 62/810,113, filed on Feb. 25, 2019, and titled "Improved Machine Learning Classification Using Annotation Type Selection" which are incorporated herein by reference in their entirety.

TECHNICAL FIELD

Some embodiments described herein generally relate to accuracy of machine learning (ML) models.

BACKGROUND

Advancements in machine classification have demonstrated dramatic improvement through the use of deep neural networks (DNNs) trained in a supervised fashion. To meet ever-increasing demands of classification performance and problem complexity, network depths continue to increase. This places a heavy demand on the size of the training sets required to avoid over-fitting additional free parameters, or weights, of the network. In many cases, hundreds of thousands or even millions of training examples must be assigned class labels. This class labelling is often done by crowd-sourcing. The volume of data makes enforcing labeling consistency and filtering out incorrect labels both challenging and costly. Training with such 'noisy labels' can drastically degrade classification performance. This makes efforts of quality control a cost factor to be balanced with the desired performance. In other cases, automation or data mining provide a means to obtain labels, however, the labels are only approximate.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
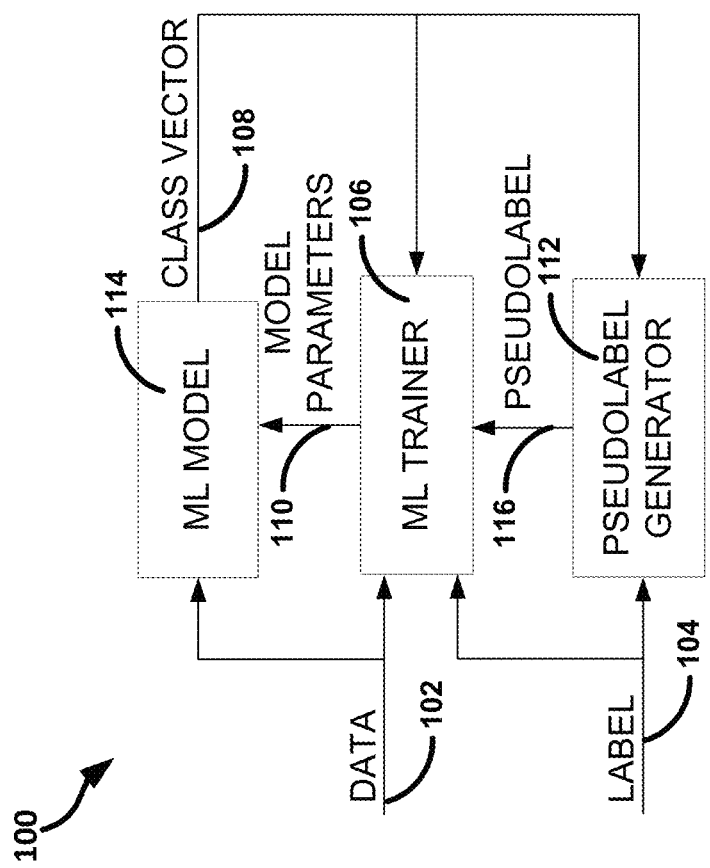
FIG. 1 illustrates, by way of example, a diagram of an embodiment of a system for ML using informed pseudolabels.

Aspects of embodiments are directed to supervised or semi-supervised deep learning. Supervised methods for machine learning with deep convolutional networks (DCNs), generally use large labeled datasets for training and evaluation. Available datasets often contain incorrect, or 'noisy', labels that may significantly reduce classification accuracy of trained networks. Manual adjudication to correct labeling errors is typically too costly or time consuming. Embodiments demonstrate that a negative effect of noisy labels on classification performance can be mitigated through the use of pseudolabels. To address noisy labels, embodiments can derive a pseudolabel by computing a maximum a posterior probability (MAP) estimate of a true class label given the data and a potentially incorrect assigned label. This estimated label is sometimes called an informed pseudolabel, since pseudolabel selection is informed by labels having a known or estimated probability of correctness. Results for the Modified National Institute of Standards and Technology database (MNIST) and Canadian Institute for Advanced Research (CIFAR)-10 datasets demonstrate performance that is competitive with or exceeds state-of-the-art.

Semi-supervised methods commonly make use of a set of unlabeled training examples in addition to labeled examples. However, the use of noisy labels can be seen as a more general form of semi-supervised learning in which the training dataset is deficient in label correctness, rather than the quantity of labeled examples. At one extreme, completely unreliable labels are equivalent to absent labels. At the other, labels are completely reliable and traditional supervised methods apply. In the continuum, partial information provided by the noisy labels can be leveraged, such as to help improve performance.

Pseudolabels can be part of a semi-supervised approach to ML training. Pseudolabels are training labels assigned by a partially trained model, or by a model trained with a subset of labeled data. The basic concept of pseudolabels has also been described as self-training or incremental training. Pseudolabels can be used in semi-supervised learning in deep neural networks (DNNs). In contrast to other semi-supervised approaches, pseudolabels are simpler and more efficient to implement. The pseudolabels use the existing partially trained model to supply alternate labels rather than requiring any architectural changes to the model. Prior implementations of pseudolabels select as the training label the class maximally predicted by the partially trained model. Embodiments, however, can use a different approach to pseudolabel selection as the class maximally predicted may not be the optimal choice when additional information is available, as in the form of noisy labels. The pseudolabel selections of embodiments can be biased towards the noisy labels according to their probability of correctness. Embodiments lose little in terms of its simplicity, and like previous pseudolabel techniques, do not require changes to the network architecture. In some embodiments, even the network loss function remains unmodified.

In embodiments, however, a new pseudolabel approach is helps make use of noisy labels with a known or estimated probability of correctness to inform pseudolabel selection. While extremely noisy labels have limited use with most supervised methods, embodiments demonstrate that a high percentage of label errors can be tolerated. This can be due to using a semi-supervised approach that takes the reliability of the labels into account. In embodiments pseudolabel selection can be biased towards the correct labels according to a given noise model.

Experimental results for this method are described. For experiments applied to the MNIST dataset, a cross-entropy loss function was used to train a CNN. Rectified linear (ReLU) activations were used for all convolutional layers. For the CIFAR-10 dataset, a cross entropy loss function to train a model. ReLU activations were used for convolutional and dense layers other than the final layer.

On the MNIST dataset, training, using informed pseudolabels of embodiments achieves over 98% accuracy even if 70% of labels are chosen completely at random, and over 95% accuracy if 90% of the labels are chosen at random. On CIFAR-10, training with informed pseudolabels provides a 24% reduction in the error rate over training with only the noisy labels when half the labels are noise.

What follows is a description of embodiments with a statistical derivation. Statistical derivations are followed by a summary of experimental results, such as to demonstrate the utility of the embodiments on standard datasets that have been corrupted with known levels of uniform class label noise.

FIG. 1 illustrates, by way of example, a diagram of an embodiment of a system 100 for ML using informed pseudolabels. The system 100 as illustrated includes an ML trainer 106, an ML model 114, and a pseudolabel generator 112. The ML model 114, often times a neural network (NN), receives a data vector 102 and produces a class vector 108 that contains confidence values for a specified set of classes that may be assigned to the data vector 102. The ML trainer 106 receives the class vector 108, the data 102, a label 104 in a first number of epochs of ML training and a pseudolabel 116 in a subsequent epoch after the first number of epochs and produces updated model parameters 110. The ML trainer 106 can operate in a semi-supervised or supervised manner, sometimes called deep learning.

Supervised deep learning can include large annotated datasets, but large datasets often contain labels 104 (sometimes called annotations) that are incorrect. The label 104 indicates a class to which the data 102 is a member. Often times the label 104 is manually generated (e.g., by a human), such as by crowd sourcing. Not all labels 104 are accurate, as the human-generated label 104 can be inaccurate. Incorrect labels used to train an NN, or other ML technique, can diminish the resulting classification accuracy of the NN. Currently, datasets exist with large numbers of incorrect, sometimes called noisy, labels 104. At least some of these datasets cannot be effectively used due to these errors in labeling.

The system 100 uses an informed pseudolabel generator 112 to generate a pseudolabel 116 that is used as a class assignment by the ML trainer 106. The informed pseudolabel generator 112 receives a class vector 108 from the ML model 114 and may also receive a label 104. The pseudolabel generator 112 can, based on the label 104 and the class vector 108, determine a pseudolabel 116 to be associated with the data 102 in a next training epoch.

Pseudolabels, traditionally, were training labels that were chosen based on the output of a partially trained ML model 114. In comparison, the pseudolabel 116 of embodiments can be determined, by the pseudolabel generator 112, using a statistical model of the label noise (see FIG. 2). In embodiments, a pseudolabel 116 can be selected that maximizes an a posteriori probability (e.g., the MAP estimate) of the correct class assignment given the data 102, the existing label 104 and the class vector 108. For some priors over the class labels, this is equivalent to maximizing a likelihood (e.g., a log likelihood) of the data 102 and the existing labels 104 and the class vector 108.

The pseudolabel generator 112 can determine the pseudolabels 116 of noisy-labeled data using Bayesian, or other statistics. Embodiments can be easy to implement, with virtually no additional computational cost. Embodiments can avoid changing the architecture of the ML model 114 or cost objective (can use existing network architectures).

Pseudolabels have been shown to be a useful semi-supervised learning approach but have only been applied previously to unlabeled data. Embodiments can apply pseudolabels 116 to data that has unreliable or noisy labels with an estimated probability of error (noise model). This can be called an "informed pseudolabel method." The informed pseudolabel method has a theoretical basis, outlined below, and this framework can be applied to tailor embodiments for a wide variety of noise models, whether the noise model is symmetric or asymmetric. Embodiments are simple and efficient to implement in terms of computation bandwidth and memory requirements, and unlike other methods for handling noisy labels, do not require changes to the machine classifier network architecture. Even with its simplicity, results demonstrate that embodiments are competitive with or exceed state-of-the-art performance for noisy labeled data on the Modified National Institute of Standards and Technology (MNIST) dataset.

Advantages or advancements provided by embodiments can include one or more of: (a) Pseudolabels can be used in place of assigned but noisy labels—previously pseudolabels were only used for unlabeled data; (b) a statistical framework with a noise model can provide a principled approach for choosing between a given label and a label predicted by the system 100 (the pseudolabel 116); (c) pseudolabels can be assigned to maximize log likelihood of the data 102 and the label 104; (d) use of pseudolabels 116 for data 102 with noisy or unreliable labels can be used as regression targets (for training the ML technique; (e) application of a statistical model of the labeling errors (noise model) to assign pseudolabels 116; and (f) selection of pseudolabels 116 by maximizing an a posteriori probability of the correct label given the data and previously assigned labels.

Pseudolabels 116 are a semi-supervised approach traditionally applied to unlabeled data. Embodiments, however, make use of noisy labels with a known or estimated probability of correctness to inform pseudolabel 116 selection. While extremely noisy labels have limited use with most supervised methods, embodiments demonstrate that a high percentage of label errors may be tolerated using a semi-supervised approach that takes the reliability of the labels into account. In embodiments, pseudolabel 116 selection can be biased towards the correct labels according to a given noise model. Experimental results for these methods are given below. On the MNIST dataset, training with informed pseudolabels achieves over 98% accuracy even if 70% of labels are chosen completely at random, and over 95% accuracy if 90% of the labels are chosen at random. On CIFAR-10, training with informed pseudolabels provides a 24% reduction in the error rate over training with only the noisy labels when half the labels are noise.

The use of unreliable labels in supervised learning methods for machine classifiers has been examined in some theoretic detail resulting in a number of noise-robust classifier, but relatively few works have addressed this problem with regard to training deep neural networks.

Others have provided a modification to deep learning models that adds a network layer to model the potentially asymmetric distribution of label noise and adjusts the loss function accordingly. In contrast to embodiments, this approach requires change to the network architecture and loss function to account for noise, rather than attempting to correct the labels.

Others have modified the neural network architecture, adding a soft-max layer to characterize the label flip probabilities, with an aggressive dropout regularization procedure to effectively de-noise labels during training. However, such adjustments present a significant computational cost as training may require substantially more iterations to converge. Additionally, experimental results described below indicate that a reduction in learning rate only slows down the inevitable over-fitting that results from training on noisy labels, with lower accuracy than the techniques of embodiments regardless of the learning rate.

Pseudolabels 116 are training labels assigned by a partially trained model, or by a model trained with a subset of labeled data. The basic concept of pseudolabels 116 has also been described as self-training or incremental training. Pseudolabels 116 were re-introduced as a method for semi-supervised learning in deep neural networks, and related pseudolabels 116 to a form entropy regularization.

1 In contrast to other semi-supervised approaches, pseudolabels 116 are extremely simple and efficient to implement, as they use the existing partially trained model 114 to supply alternate labels rather than requiring any architectural changes to the model. Prior implementations of pseudolabels 116 select as the training label the class maximally predicted by the partially trained model. As shown by results, this may not be the optimal choice when additional information is available, as that which is available using noisy labels. Pseudolabels 116 can be generalized to consider the existence of labels 104 with a given noise model 114.

The resulting pseudolabel 116 selections can be biased towards the noisy labels according to their probability of correctness as determined by the pseudolabel generator 112. Embodiments lose little in terms of simplicity, and like previous pseudolabel techniques, do not require changes to the ML model 114 architecture. In fact, even the network loss function can remain unmodified.

The ML trainer 106 can, based on the pseudolabel 116, generate more accurate model parameters 110 than an ML trainer 106 that operates based on only the labels 104. The ML trainer 106 can be more accurate because the pseudolabels 116 can account for noise in the label 104 that can cause the label 104 to be inaccurate.

The class vector 108 can include a confidence for each class to be classified by the ML model 114. The class vector 108 can indicate, for each class, an odds of the probability of the class divided by the probability of not the class. The class vector 108 can be log-odds of the probability of the class divided by the probability of not the class. This is sometimes called logits. The logits are the inverse of the sigmoidal function or logistic transform.

The model parameters 110 are weights associated with respective structures of the model. A model parameter 110 is a configuration variable that is internal to the model. The model parameter 110 is estimated from data. The model parameter 110 is used by the ML model 114 in making a prediction.

In some embodiments, the ML model 114 can include a segmentation model. The segmentation model can classify one or more image pixels. The provided labels can include an annotation type (bounding boxes, ellipses, point targets, polygons) for target objects represented in input images. The pseudolabel generator 112 can implement a noise model that estimates the probability of mislabeled pixels where the pixel labels are derived from the provided labels.

Figure 2:
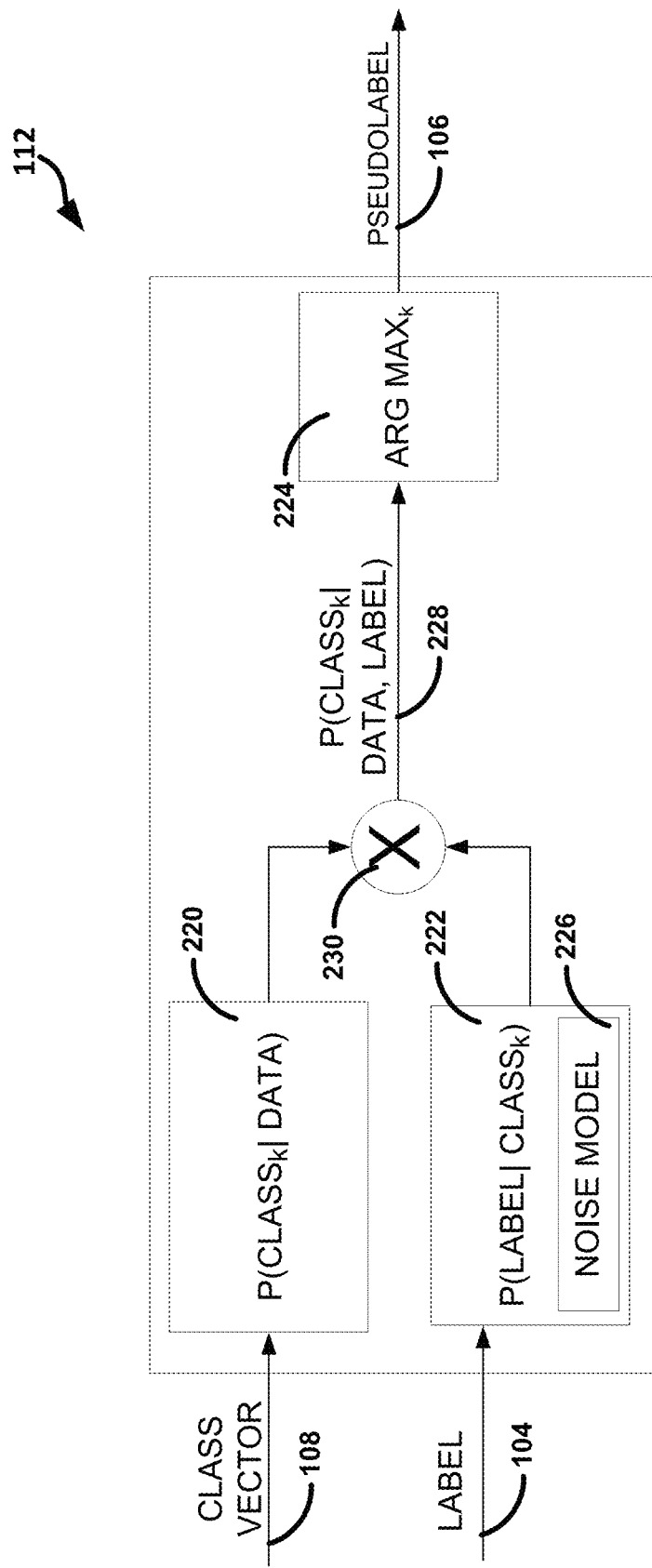
FIG. 2 illustrates, by way of example, an exploded-view diagram of an embodiment of the pseudolabel generator.

FIG. 2 illustrates, by way of example, a diagram of an embodiment of the pseudolabel generator 112. The pseudolabel generator 112 can receive the logits 108 and the label 104, $(x_n, \hat{y}_n)$, where $x_n$ denotes the input data, and $\hat{y}_n$ denotes potentially incorrect class labels (the label 104)∈1, . . . , K. The pseudolabel generator 112 can determine a pseudolabel 116, $y_n'$, as a surrogate for a true label $y_n^*$ to train an ML model (e.g., a machine classifier). The ML model can include a deep neural network (DNN), such as a convolutional neural network (CNN), recurrent neural network (RNN), or the like, or other ML technique. The discussion that follows assumes the ML technique includes an NN in which the output layer activations, $f_n^k(x_n)$ are logits (log of the odds $p/(1-p)$, where p is probability), and considered to estimate the conditional log probability of each class k∈1, . . . , K:

$$f_n^k(x_n) \approx \log P(y_n^* = k | x_n) \tag{1}$$

Assume the noise process that generates label errors is dependent only on the correct class label, and independent of the data 102, such that:

$$P(x_n, \hat{y}_n | y_n^*) = P(x_n | y_n^*) P(\hat{y}_n | y_n^*) \tag{2}$$

In other words, assume that network predictions and the noisy class labels provide independent evidence of the true class labels. Note that this conditional independence assumption is violated, for example, if labeling errors are more common for noisy data instances which may also be more poorly predicted by the network.

In a traditional implementation, pseudolabels are assigned the predicted value of a partially trained network (e.g., $y_n' = \text{argmax}_k f_n^k$). However, such an approach does not consider any, albeit partial, information provided by the noisy labels $\hat{y}_n$. Instead, the pseudolabel generator 112 can select the pseudolabel 116 that maximizes the probability of the true class assignment given the data 102 and the estimated label 104 using a statistical method known as maximum a posteriori (MAP) estimation. In embodiments, the pseudolabel generator 112 can maximize the log a posteriori probability to determine the pseudolabel 116, which also maximizes the a posteriori probability. For uniform priors over the true class, this is also equivalent to maximizing the likelihood or log likelihood of the observed label 104 and data 102. In mathematical terms, the pseudolabel 106 can be represented as:

$$y'_n \, \text{argmax}_k \, [\log P(y^*_n = k \mid x_n, \hat{y}_n)] \quad (3)$$

Applying Bayes' theorem and the conditional independence assumption expressed in equation (2), $$P(y^*_n \mid x_n, \hat{y}_n) = \frac{P(x_n, \hat{y}_n \mid y^*_n) P(y^*_n)}{P(x_n, \hat{y}_n)} \quad (4)$$

$$= \frac{P(x_n \mid y^*_n) P(\hat{y}_n \mid y^*_n) P(y^*_n)}{P(x_n, \hat{y}_n)} \quad (5)$$

$$= \frac{P(y^*_n \mid x_n) P(x_n) P(\hat{y}_n \mid y^*_n)}{P(x_n \hat{y}_n)} \quad (6)$$

$$\propto P(y^*_n \mid x_n) P(\hat{y}_n \mid y^*_n). \quad (7)$$

A matrix $\Lambda$ can be defined as $$\Lambda_{i,j} \overset{\text{def}}{=} \log P(\hat{y}_n = i \mid y_n^* = j) \quad (8)$$

With the network approximation (1), equation (3) can be expressed as:

$$y'_n = \underset{k}{\text{argmax}} \left[ f^k_n(x_n) + \Lambda_{\hat{y}_n, k} \right]. \quad (9)$$

If labels are stored as an N×K one-hot matrix $\hat{Y}$ for N data instances, and the network output is an N×K matrix F, the inner expression in Equation (9) can be performed with a single matrix multiplication and addition: $F + \hat{Y}\Lambda$. A one-hot matrix includes values that can be represented in binary with a single one, and the remaining values zero. For example: 0001 or "1", 0010 or "2", 0100 or "4", and 1000 or "8" are the one-hot numbers for a four-bit binary number set.

It is a general practice to train neural networks on a balanced dataset, where each class is equally represented. A potential challenge arises if marginal distributions are unequal, (e.g., $P(\hat{y}) \neq P(y^*)$).

In this case, while the assigned labels 104 may have been initially balanced for training, the resulting pseudolabels 116 are likely no longer balanced between classes. If this situation is not handled properly, the trained ML model may become biased towards generating a class with a higher frequency of pseudolabels 116. Approaches to correct this problem include oversampling the dataset according to $P(y^*)/P(\hat{y})$, adjusting the loss function, or weighting the contribution of each instance to the network update to account for the class imbalance.

While the noise model explored in the following section is symmetric and does not have this imbalance, another symmetric or asymmetric noise model can be used in its place. A uniform class noise can be applied to a varying percentage of training labels, where $\rho$ is the probability of changing the label. Given this noise model, $$P(\hat{y}_n = i \mid y^*_n = j) = \begin{cases} (1-\rho) + \rho/K & \text{if } i = j \\ \rho/K & \text{if } i \neq j \end{cases} \quad (10)$$

and $$\Lambda_{\hat{y}_n, k} = \delta_{\hat{y}_n, k} \log[K(1-\rho)/\rho + 1] - \log \rho/K, \quad (11)$$

where $\delta_{i,j}$ is the Kronecker delta function. Since $\log \rho/K$ is constant over k, pseudolabels can be assigned according to $$y'_n = \underset{k}{\text{argmax}} \left[ f^k_n(x_n) + \lambda \delta_{\hat{y}_n, k} \right], \quad (12)$$

where parameter $\lambda$ is theoretically optimal at a value of $$\lambda^* = \log[K(1-\rho)/\rho + 1]. \quad (13)$$

FIG. 2 illustrates, by way of example, an exploded-view diagram of an embodiment of the pseudolabel generator 112. The pseudolabel generator 112 receives the label 104 and the class vector 108 determined by the ML model. The pseudolabel generator 112 can determine, based on the class vector 108, a probability 220 of each class label, given the data 102. The probability 220 of the true class label given the data 102 can be determined based on the input/output examples used to train the ML model 114 in a previous epoch and the information in the class vector 108 generated by the ML model 114. In some embodiments, the output activations of an NN model can be trained to estimate the probability 220 using the input/output examples. In other embodiments, the output activations of a NN model can be trained to estimate a log probability for each class.

The pseudolabel generator 112 can determine, based on the label 104, a probability 222 that the label 104 was presented given the true label is of a particular class, for each class to be identified by the ML model. The probability 222 of the label given the true label can be determined based on a model of the label noise. In some embodiments, this noise model may be based on prior knowledge about the cause labeling errors. In some embodiments, the noise model can be determined empirically from a subset of the data. In some embodiments, the noise model may be based on manual verification of a subset of the labels. In some embodiments, the noise model may be based on the cumulative output of the ML model 114. The true labels can be determined for at least some of the data 102. For each data, the associated label 104 can be recorded along with the true label. The percentage of classifications having an associated label 104 relative to all the entries with the true label can indicate the probability 222.

In some embodiments, the probability 222 can be determined based on a symmetric or asymmetric noise model 226. The noise model 226 can be determined empirically, as discussed previously regarding determining the probability 222. In some embodiments, the noise model 226 can be assumed symmetric. In such an embodiment, it is assumed that the determined class vector 108 can be mistaken for any other class with equal probability.

The pseudolabel generator 112 can determine the pseudolabel 116 by determining the class label associated with the maximum 224 of a mathematical combination 230 of the probabilities 220, 222. For example, the combination 230 can include one or more mathematical operations on the probabilities 220, 222, such as addition, subtraction, multiplication, division, log, exponent, min, max, floor, ceiling, modulus, or the like. The combination 230 of the probabilities 220, 222 can indicate a probability 228 of the class label ("class$_k$" in the terms of FIG. 2) given the data and label. In some embodiments, probabilities 220, 226 can be multiplied to determine a probability 228 for each class. In some embodiments the probabilities 220, 226 can be replaced with log probabilities which can be summed to determine a log probability having the same maximal class.

Consider a system that determines which class to associate with data and assume that the probability 220 of the class given the data is [0.22, 0.76, 0.08] and probability 222 of the label 104 given the class is [0.89, 0.11, 0]. The maximum of probability 220 times probability 222 is max [0.20, 0.08, 0]=0.20. Since 0.20 is associated with the first entry, the pseudolabel generator 112 can determine the pseudolabel 116 is the class associated with the first entry.

For experiments on embodiments applied to the MNIST dataset, a simple Convolutional Neural Network (CNN) was trained with a cross entropy loss function. The CNN included the following structure:
  Convolution 5×5—32, ReLU, MaxPool 2×2
  Convolution 3×3—64, ReLU, MaxPool 2×2
  Fully Connected—1024
  Dropout Regularization—Rate 0.5
  Fully Connected Softmax—10

For experiments on embodiments applied to the CIFAR-10 dataset another CNN was trained with a cross entropy loss function. The CNN include the following structure:
  Convolution 3×3—96, ReLU
  Convolution 3×3—96, ReLU
  MaxPool 3×3—Stride 2
  Batch Normalization
  Dropout Regularization—Rate 0.2
  Convolution 3×3—96, ReLU
  Convolution 3×3—96, ReLU
  MaxPool 3×3—Stride 2
  Batch Normalization
  Dropout Regularization—Rate 0.2
  Fully Connected, ReLU—1024
  Dropout Regularization—Rate 0.5
  Fully Connected Softmax—10

Table 1 shows test classification error averaged over 5 training trials, with independent label noise added to the training set for each trial. Each trial was run to 1000 epochs using the Adam optimizer with a learning rate of 0.001. Pseudolabels were introduced only after 10 epochs of training with noisy labels. Bolded error rates indicate results with the lowest error for each noise level. Error rates in italics indicate results trained using the theoretically optimal $\lambda=\lambda^*$ according to Equation (13). Differences between these two in terms of error are generally small, less than 2.5%. Note that the use of pseudolabels 116 significantly improves classification accuracy for noisy labels. Except for 90% noise, informed pseudolabels ($\lambda>0$) provide higher accuracy than traditional pseudolabels ($\lambda=0$). That can be due, at least in part to the informed pseudolabels 116 accounting for the partial information provided by the noisy class label.

Informed pseudolabels 116 provided an advantage even in the case where there was no added label noise, and in general, the best results were obtained with slightly lower than predicted $\lambda$ values. This may indicate some inherent uncertainty regarding the truth labels in the MNIST dataset. Large error rates at the bottom right of the chart indicate overfitting to noise. This effect is explored in the next section.

TABLE 1

| | Noise Level % = 100ρ | | | | | |
|---|---|---|---|---|---|---|
| λ | 0 | 10% | 30% | 50% | 70% | 90% |
| 0 | 1.37 | 1.61 | 1.92 | 2.14 | 2.41 | 4.35 |
| 0.747 | 0.97 | 1.03 | 1.22 | 1.52 | 1.90 | *4.43* |
| 1.665 | 0.88 | 0.92 | 1.01 | 1.23 | *1.86* | 8.05 |
| 2.398 | 0.80 | 0.91 | 1.12 | *1.38* | 2.24 | 63.46 |
| 3.192 | 0.79 | 0.92 | *1.18* | 2.63 | 33.03 | 68.71 |
| 4.511 | 0.81 | *1.08* | 9.19 | 14.54 | 30.35 | 67.87 |
| ∞ | *0.89* | 4.40 | 6.95 | 13.84 | 30.14 | 68.82 |

MNIST classification error rates (%) by noise probability and threshold. Error rates are averaged over 5 trials, with independent label noise added to the training set for each trial. Bolded values indicate the lowest error rate for each noise level.
Italicized values indicate the error rate for the threshold selected by formula based on the noise model.
Threshold of 0 is equivalent to basic pseudolabel algorithm, while infinite threshold is equivalent to supervised-only training without pseudolabels.

Experiment 2: MNIST Learning Rate Comparison

The previous results indicate that training with noisy labels can lead to significant overfitting to the noise. In this case, the testing error rate initially decreases with the training error, but eventually increases at each epoch even as the training error rate and loss continue to decrease. A suggestion is to adjust the learning rate and/or batch size to accommodate an increase in label noise, even to extreme levels. To test this approach, the same MNIST model used in Experiment 1 was trained without pseudolabels, but at a reduced learning rate, 0.00001. The same optimizer and dropout rates from the previous experiment were used, and only the learning rate was adjusted. Noise level for the labels was set to 70%. The resulting test and train error rates are plotted in FIG. 3.

Figure 3:
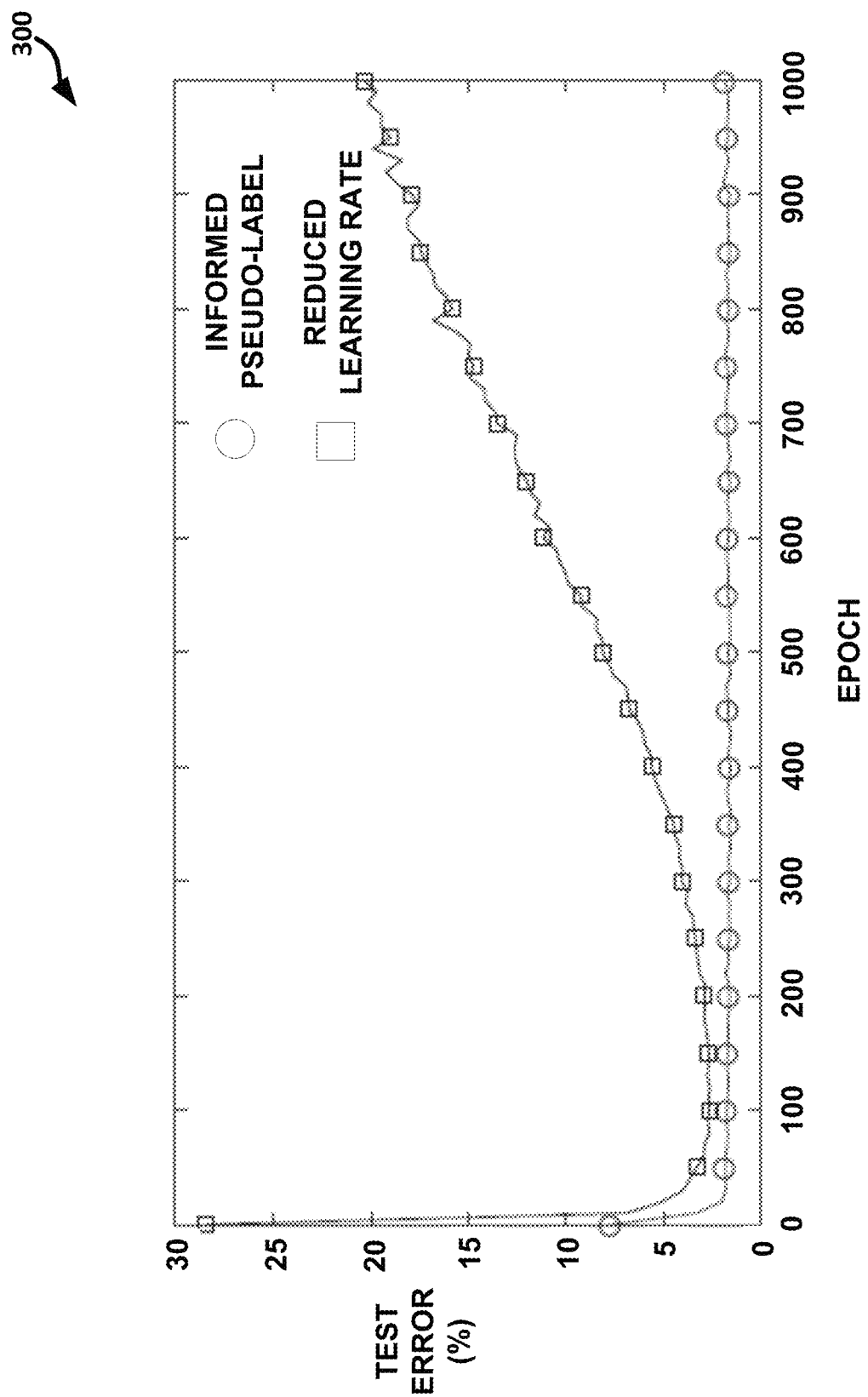
FIG. 3 illustrates, by way of example, a diagram of an embodiment of a graph of test error rate vs epoch for informed pseudolabels and reduced learning rate models.

FIG. 3 illustrates, by way of example, a diagram of an embodiment of a graph 300 of test error rate vs epoch for informed pseudolabels and reduced learning rate models.

While the training error rate continues to decrease for the reduced learning rate, the testing error decreases to 2.88% by epoch 70, and then increases to around 20% by epoch 1000. Early stopping is a common practice to avoid overfitting. Using the reduced learning rate, and assuming a best-case stopping criteria, the lowest error rate that achieved from early stopping in this experiment is 2.88. As seen in Table 1, a test error rate 1.23% is achieved using informed pseudolabels. Thus, even with an ideal early stopping criteria, a reduced learning rate is not sufficient to achieve the best performance.

Experiment 3: CIFAR-10 Pseudolabel Comparison

An informed pseudolabel technique was tested on the CIFAR-10 dataset having uniform class noise levels ranging from 0 to 50%. Training was performed with parameter $\lambda=\lambda^*$ according to Equation (13) for each noise model. For baseline comparison, the model was trained with $\lambda=0$, equivalent to a traditional pseudolabel implementation ignoring the given class label, and $\lambda=\infty$ (without pseudolabels). Table 2 shows the test classification error averaged over 5 training trials, with independent label noise added to the training set for each trial. Each trial was run to 300 epochs using the Adam optimizer with a learning rate of 0.001. Pseudolabels were introduced only after 5 epochs of training with noisy labels. Bolded error rates indicate results with the lowest error for each noise level. For each noise level, informed pseudolabels ($\lambda=\lambda^*$) provides higher accuracy than standard pseudolabels or training with only the given labels.

TABLE 2

| λ | Noise Level % = 100ρ | | | | | |
|---|---|---|---|---|---|---|
| | 0 | 10% | 20% | 30% | 40% | 50% |
| 0 | 39.34 | 41.25 | 41.70 | 42.88 | 43.82 | 46.35 |
| λ* | 26.26 | 29.33 | 31.92 | 34.59 | 37.35 | 39.66 |
| ∞ | 26.26 | 30.71 | 35.25 | 39.95 | 45.38 | 51.64 |

CIFAR-10 classification error rates (%) by noise probability and threshold. Error rates are averaged over 5 trials, with independent label noise added to the training set for each trial. Bolded values indicate the lowest error rate for each noise level.
Threshold of 0 is equivalent to basic pseudolabel algorithm, while infinite threshold is equivalent to supervised-only training without pseudolabels.

Embodiments thus far provide ML model techniques using semi-supervised learning. Embodiments can be useful in cases where training labels are unreliable, or noisy. Embodiments are a variation of pseudolabels, which selects labels based on the log likelihood of the data and the noisy labels. On the MNIST dataset, this method achieves over 98% accuracy even if 70% of labels are chosen completely at random. This is notable, since the use of pseudolabels is more efficient in terms of memory and processing bandwidth compared to other methods and requires no change to the network architecture. On CIFAR-10, training with informed pseudolabels provides a 24% reduction in the error rate over training with only the noisy labels when half the labels are noise. Embodiments further demonstrated how label noise affects classification accuracy. This may be due to overfitting to the noisy labels as evidenced by a classic symptom: testing error increases during training while training error continues to decrease.

The statistical framework for informed pseudolabels is applicable to a variety of label noise models. If the label noise is asymmetric, resulting in different marginal distributions for given and correct labels, some correction to the learning procedure can help balance the learning.

In some cases, the noise model is known, and thus the weighting parameters can be derived from the noise model. In many cases, the noise characteristics are unknown and must be estimated. Under assumptions of uniform label noise independent of the class label, a single parameter can be tuned with a validation set. However, more complex noise models will result in more weighting parameters, in the form of a matrix A, that cannot easily be determined through validation runs. It may be possible to estimate this matrix during the learning procedure.

Improved ML Classification Using Annotation Type Selection

The most prominent machine learning (ML) methods in use today are supervised, meaning they require ground-truth labeling of the data on which they are trained. Annotating (sometimes called labeling) data is arduous and expensive. Additionally, data sets for image object detection may be annotated by drawing polygons, drawing bounding boxes, or providing single points on targets. Selection of annotation technique is a tradeoff between time to annotate and accuracy of the annotation. When annotating a dataset for machine object recognition techniques, an ML model designer may not know the most advantageous method of annotation for their experiments.

Embodiments can include a neural network trained using the different types of annotations and comparing the detection accuracy of and differences between the resultant models. In addition to the accuracy, cost is analyzed for each of the models, and respective datasets.

Over the past few years, a tremendous amount of research has focused on improving DNN architectures and their efficacy for applications in computer vision. Many of these works focus on the architectures themselves, and less has been done to explore the data which makes these networks run. Since NNs are generally only as good as the data they are trained on, the input data can be important for the NN. For supervised methods, this includes the annotations that are used as ground truth.

Some modern deep networks require an even greater burden of labeled data than previous generations. Annotating datasets for use in supervised ML can be expensive and time consuming due to the amount of data often required. While a number of works have looked at the effects of noise, and adversarial perturbations in the training set, little information is currently available on the tradeoffs between image annotation types and the resulting performance of the network. Approaches for manually annotating imagery, such as with polygons, bounding boxes, or target centroids, have considerably different annotation cost due to their varying complexity, and the utility of each may depend on the use case. Therefore, it can help to understand the tradeoffs between cost and performance for each type so as to select the most appropriate method for a given use case. Cost-per-label information can be gathered from commercial annotation companies or other sources.

Others have described the need for exploring different data annotations and a method of sequentially feeding higher fidelity annotations when the prior annotation was not sufficient for a traditional segmentation model. Considering the cost of image annotation, number of images needed for training, and the widespread ramifications of such research for appropriately tailoring annotations to the demands and goals of a given application, determining a best annotation type of multiple annotation types can be beneficial. The potential to cheapen data annotation, even for small numbers of use cases, is felt throughout the computer vision industry.

The most prominent ML methods require ground-truth labeling of the data on which they are trained. Supervised learning using deep CNNs represents the current art in machine vision. When trained with sufficient quantities of properly labeled data, these networks have been shown to be highly accurate, close to or potentially exceeding human performance for many classification and detection tasks. Present embodiments focus on the challenge of detecting vehicles in satellite images, while applicable to many other problems.

Despite its potential, supervised learning carries a heavy data requirement that is often a limiting factor for success. Labeling sufficient amounts of data can be prohibitively expensive, especially when using the highest fidelity methods. Commercially, datasets become a competitive advantage and barriers to entry grow ever higher for new players. Annotating datasets can be prohibitively costly, setting implementation back months or taking up significant portions of budgets. In many of these cases, users may pay for more annotation fidelity than they need. If high fidelity annotations are not required to achieve the necessary performance, cheaper options may represent a significant cost or time savings. Embodiments herein provide a workflow that supports the type of cost benefit analysis needed to realize these savings.

While a lot of work in computer vision has labeled images with a single class per chip, this is only appropriate when a single object dominates the field of view. Here, embodiments focus on pixel-wise annotation methods that are more useful for image segmentation and semantic labeling, including the detection and classification of multiple objects in a scene. The three most common pixel-wise annotation methods used for this purpose are polygons, bounding boxes, and centroids.

Polygons, closest to ground truth, often use an annotator to identify many points around a target of interest to fit its shape. This makes polygons the most time consuming, and thus the most expensive of the three annotation types analyzed. Bounding boxes are defined as the tightest fitting box around a target. These are more time efficient to produce than polygons, requiring only two clicks from the annotator, however they may encapsulate a large number of pixels outside of the true target area. Centroids are relatively trivial to annotate, requiring only a single point at the geographic center of the target. Embodiments can extrapolate a circular "point-target" region around each centroid having the same area as the average target. This allows the network to train on a region instead of a single pixel. Similar to bounding boxes, these regions may not fit well to the identified target. While there are generally fewer false positive pixels with point targets than bounding boxes, they also contain false negative pixels where the circular regions clip the targets.

Pixel discrepancies resulting from bounding boxes and point targets may potentially hamper network performance, discouraging researchers from pursuing these data annotation methods. However, the cost savings for annotation makes them more attractive options otherwise.

One commercial annotation company estimated that it takes humans six times longer to draw a polygon around a target and two times longer to draw a bounding box than simply putting a single point marker on a target centroid. Another source shows the time difference between bounding boxes and polygons as 7 seconds per bounding box and 54 seconds per polygon for a factor of over seven-to-one.

Figure 4:
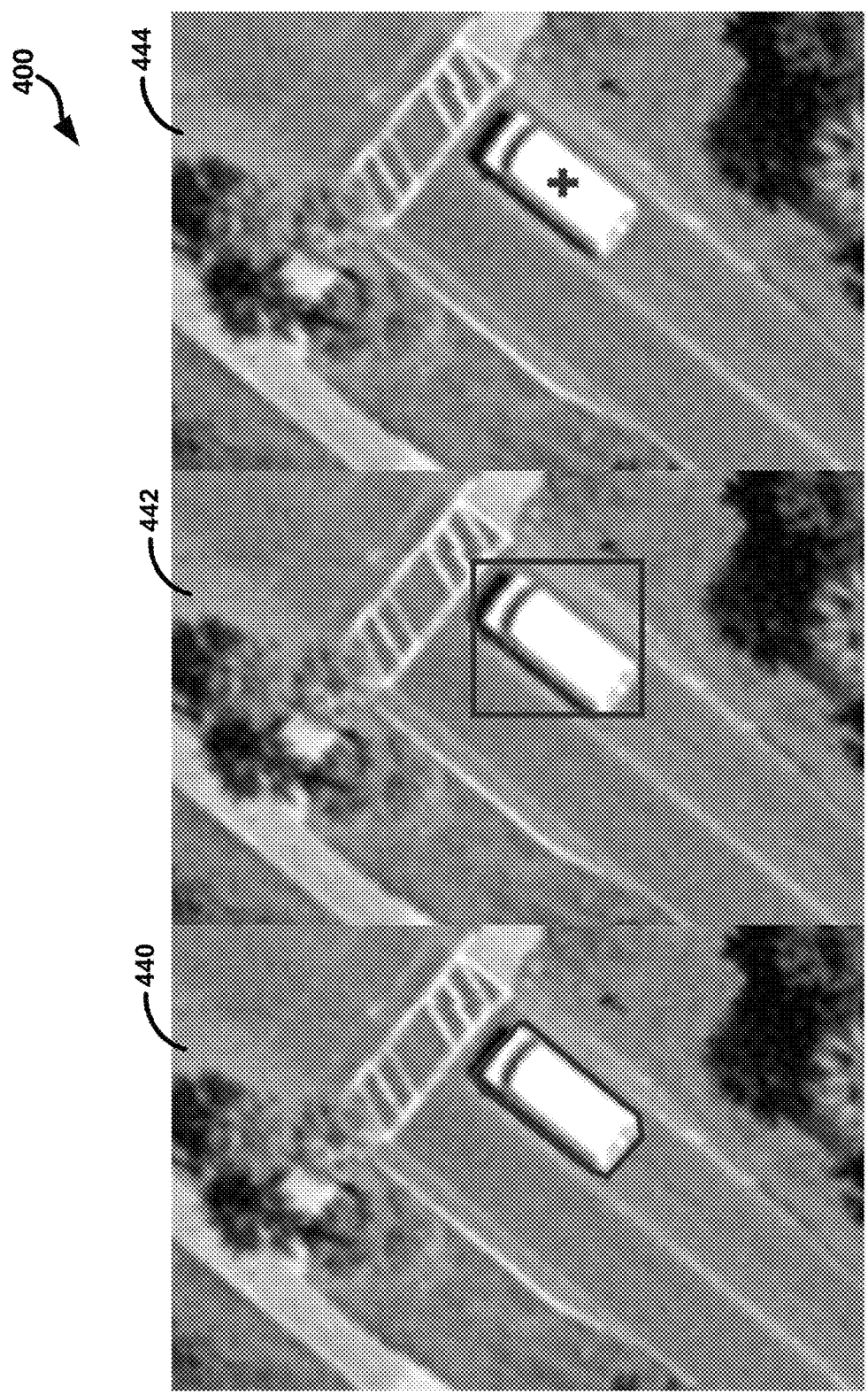
FIG. 4 illustrates images of targets identified with polygons, bounding boxes, and target centroid.

FIG. 4 illustrates images 400 of targets identified with polygons 440, bounding boxes 442, and target centroid 444. Image from F. Tanner, B. Colder, C. Pullen, D. Heagy, M. Eppolito, V. Carlan, O. C. and P. Sallee, "Overhead Imagery Research Data Set—An annotated data library and tools to aid in the development of computer vision algorithms," in IEEE® Applied Imagery Pattern Recognition Workshop, Washington D.C., 2009.

Three separate networks were trained, one for each annotation type (polygon, bounding box, and centroid), and compared network performance for detecting two classes (car/non-car) at each pixel location. The following describes the data, network architecture and evaluation metrics used in our experiment. An overview of our workflow, starting with separating and conditioning the data for use in network training as described in this section, is presented in FIG. 5.

Figure 5:
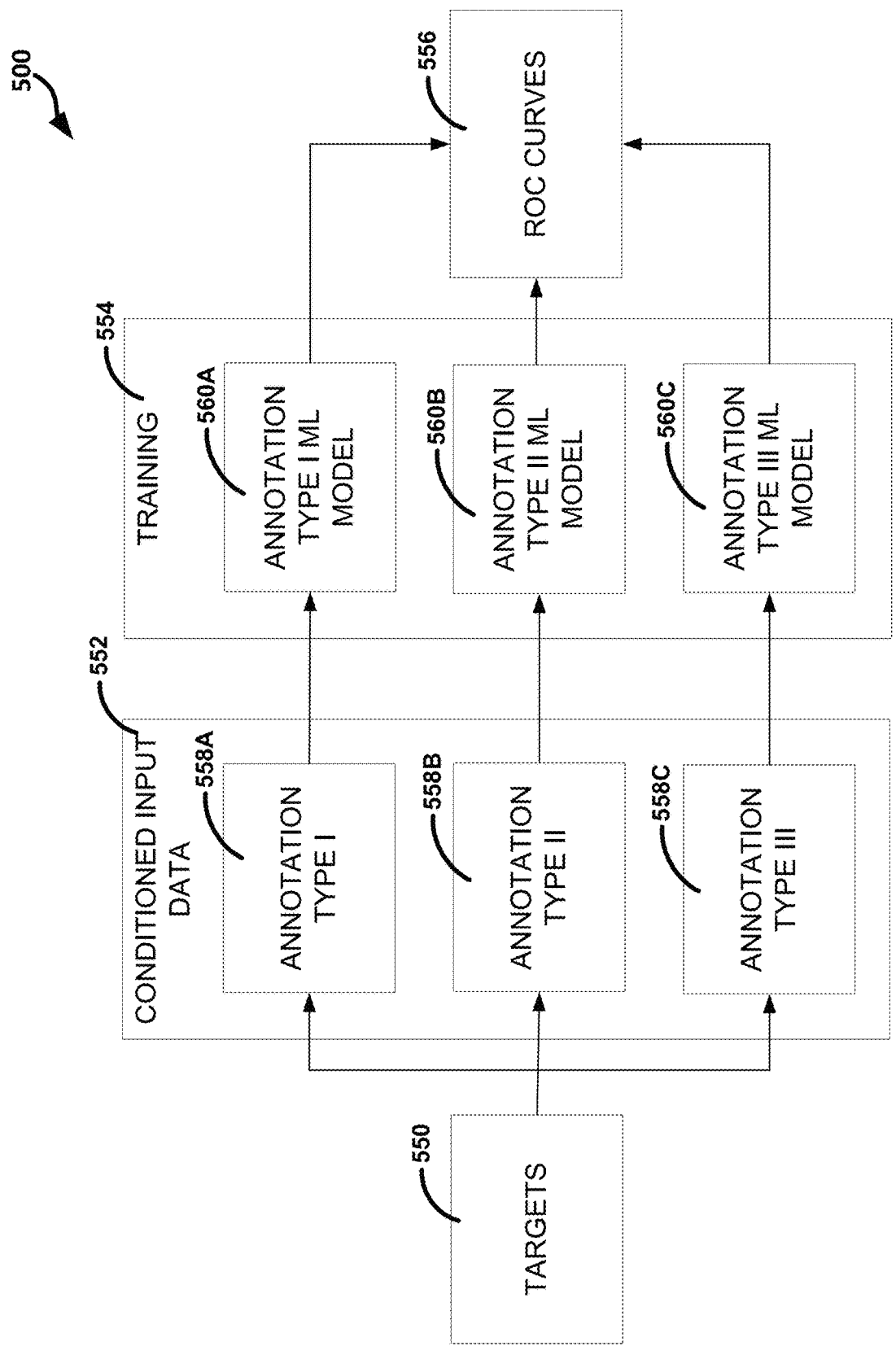
FIG. 5 illustrates, by way of example, a diagram of an embodiment of a system for annotation selection.

FIG. 5 illustrates, by way of example, a diagram of an embodiment of a system 500 for annotation selection. The system 500 as illustrated includes input data of targets 550 to be detected, conditioned input data 552 that includes a subset of the targets 550 for each annotation type 558A, 558B, 558C, and an ML trainer 554. Herein, conditioned input data means that the input data has identified targets 550. Conditioned input data refers to a distillation of the three annotation types 558A, 558B, 558C from an initial annotation. The targets 550 are objects in images to be detected by the trained ML model. In the example of FIG. 4 the object is a vehicle.

The ML trainer 554 alters parameters of an ML model 560A, 560B, 560C based on an output of the NL model and a loss function. The parameters in terms of an NN or other ML model are sometimes called weights.

A receiver operating characteristic (ROC) curve 556 can be generated based on the performance of training the model 560 or operating the model 560. The ROC curve 556 analyzes an ability of a predictive model to distinguish between true positive and negative. The ROC curve 556 is a plot of sensitivity (probability of predicting a real positive will be a positive) vs the probability of predicting a real negative will be a positive.

Data Selection and Mask Creation

Experiments discussed can be based on the Overhead Imagery Research Dataset (OIRDS). OIRDS is open source, freely available, and includes both centroid and polygon annotations, in addition to other vehicle features. The OIRDS is often used to test vehicle detection techniques. For training the ML models 560, binary masks were generated for each annotation type. Bounding boxes were calculated from the polygons, using the maximum and minimum x and y coordinates. For point targets, a circle was generated around each centroid with an area of the average target size. Despite the richness of OIRDS, it is still a very small dataset compared to most modern datasets required for deep learning. The OIRDS contains approximately 1000 images with approximately 2000 targets versus ImageNet with its 14+ million annotated images.

Network Architecture and Implementation

Embodiments can use an Overfeat or similar network architecture. This architecture can be beneficial because of its simplistic architecture, ease of implementation, and competitive results. In embodiments, this network can be modified to retain its spatial dimensions, by setting padding to "same," making sure that edges are not lost, as well as removing stride in the convolution and pooling layers. This maintains a 257×257 output size equal to the input image dimensions, where each output node represents the detected class for an image pixel. This is compared to training masks of embodiments, or ground truth information, as presented elsewhere herein. To further prevent downsizing, the last two fully connected layers of the network can be removed. Pooling layers or embodiments can include max pooling and prior to an output layer of embodiments that can implement implemented a dropout layer with probability of 0.5.

The ML trainer 554 can include a Tensorflow deep learning package or the like. Training can be performed using RMS-Prop optimizer with a SoftMax cross-entropy loss function and a learning rate of 0.00005, or other learning rate.

Each network can be trained for two-hundred (or other number of) epochs with each epoch consisting of a number of batches of a number of images.

Figure 6:
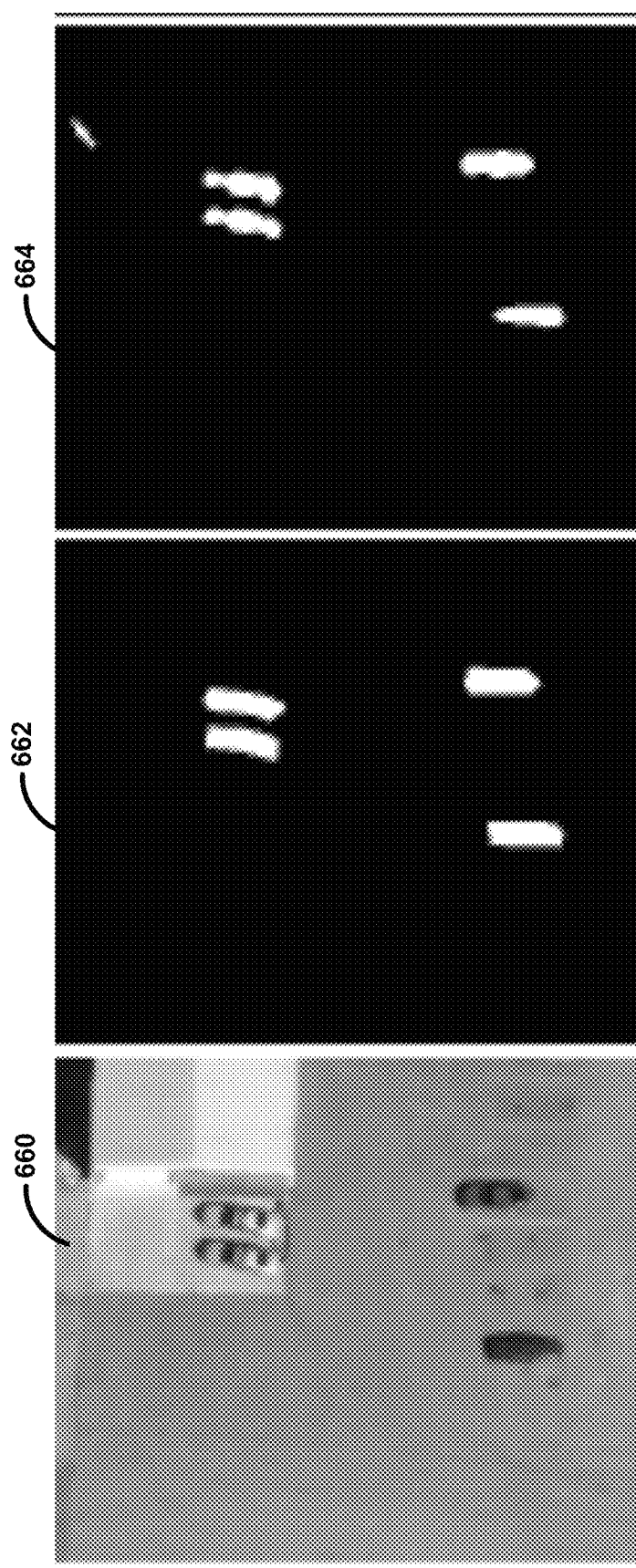
FIG. 6 illustrates, by way of example, a diagram of an embodiment of, from left to right, an input image from overhead imagery research data set (OIRDS), a polygon input mask for the image, and an output of the ML model.

FIG. 6 illustrates, by way of example, a diagram of an embodiment of, from left to right, an input image 660 from OIRDS, a polygon input mask 662 for the image 660, and an output 664 of the ML model 560. See FIGS. 9 and 10 for input masks and outputs for the bounding boxes and point targets, respectively.

Evaluation Criteria

To evaluate performance, embodiments can use the ROC curve 556 evaluated at all pixel locations, an area under the curve (AuC), or a combination thereof, among others. For each ML model 560, the ROC curve 556 can be produced using its own respective annotation type that it was trained with as the truth, and also a curve using another annotation type as the truth. An example ROC curve is provided for reference in FIG. 7.

Figure 7:
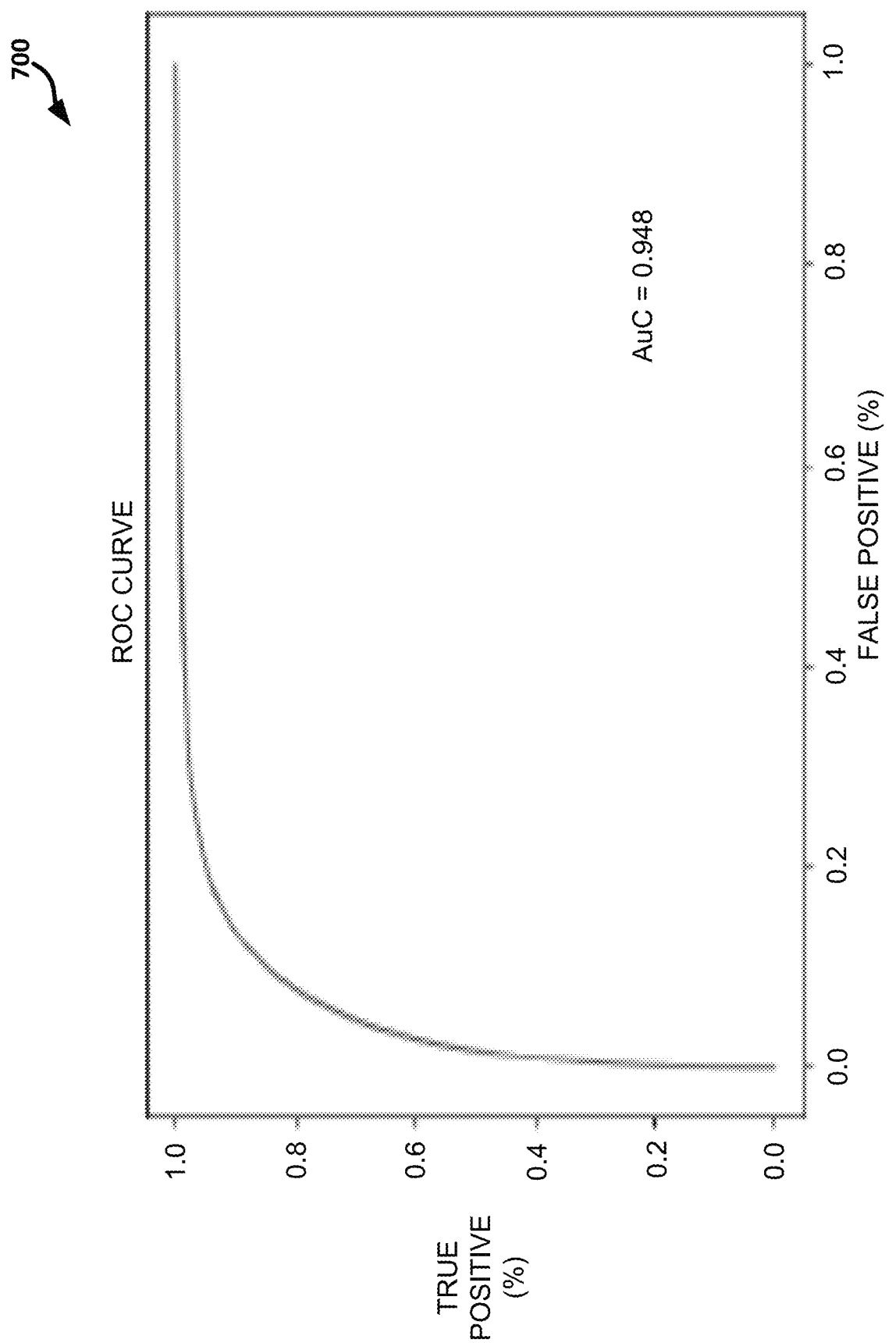
FIG. 7 illustrates, by way of example, a diagram of an embodiment of a receiver operation characteristic (ROC) curve.

FIG. 7 illustrates, by way of example, a diagram of an embodiment of a ROC curve 700. The ROC curve 700 shows the ratio of false positives to true positives for a range of thresholds applied to the network score, yielding a means of comparing performance agnostic to a threshold value. A perfect ROC is a vertical line at 0.0 false positive rate and a horizontal line at 1.0 true positive rate, with an AuC of 1.

Figure 8:
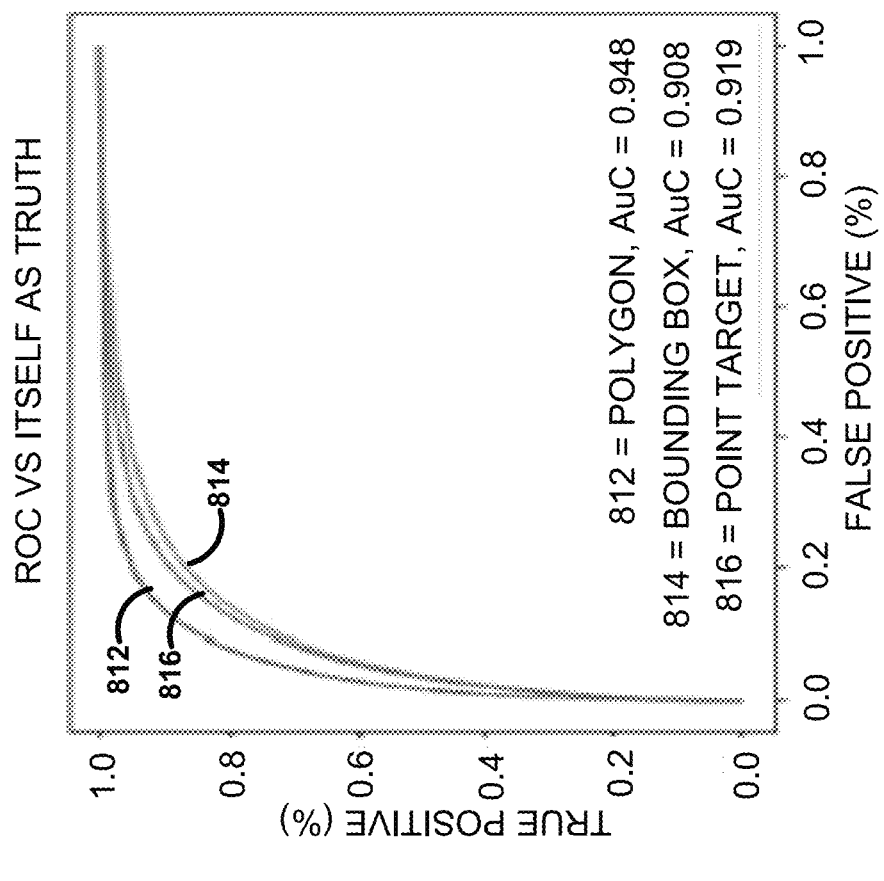
FIG. 8 illustrates, by way of example, a diagram of an embodiment of ROC curves and corresponding area under curve (AuC) values for the ROC curves.
Figure 8:
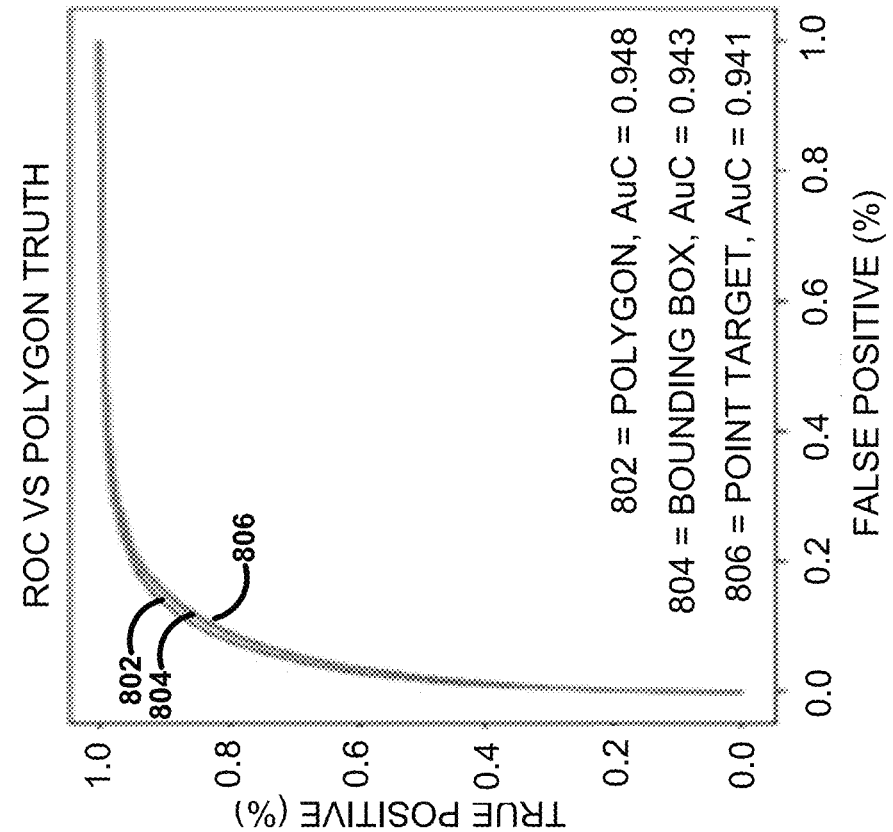

FIG. 8 illustrates, by way of example, a diagram of an embodiment of ROC curves and corresponding AuC values for the ROC curves. The right plot of FIG. 8 shows ROC curves for each ML model 560 evaluated with the type of annotations they were trained with, for example, a bounding box model was trained and evaluated using bounding box annotations (represented by line 814), while the point target model was trained and evaluated using point targets (represented by line 816). The line 812 represents the ROC for the polygon type ML model. All of the ML models had an AuC value of over 0.9. As expected, the polygon network outperformed both bounding box and point target networks with an AuC of about 0.95. Although bounding boxes are considered a higher fidelity annotation than point targets, the point target network outperformed the bounding box network in this evaluation.

The left plot in FIG. 8 compares the ROC curves obtained when each network is evaluated using the polygon labels as truth. From this, it can be seen that both the bounding box network and point target network exhibited better results against the polygon truth than against their own truth labels. A line 802 represents the polygon ROC, a line 804 represents a bounding box ROC, and a line 806 represents a point target ROC. Although the polygon network still outperforms both of the other networks, all three now have similar performance, within 0.007 AuC. This indicates that the networks are not learning to paint the shape of the training labels. Rather, each network learns to paint detections that approximate the actual shape of the target object. This effect can also be seen qualitatively in the next section.

Qualitative results were extracted by creating an image out of the input masks and the output detections of the network. This was done while testing with each image producing an output detection tensor to be turned into an image. For visual clarity, the input and output masks were overlaid with the input image and the output detection mask was compared to a threshold, such that any pixel of confidence over 0.2 was classified as a detection and made 1 (pure white) and any pixel of confidence lower than 0.2 was set to be zero (pure black). The values are merely examples and other values could be used.

Figure 9:
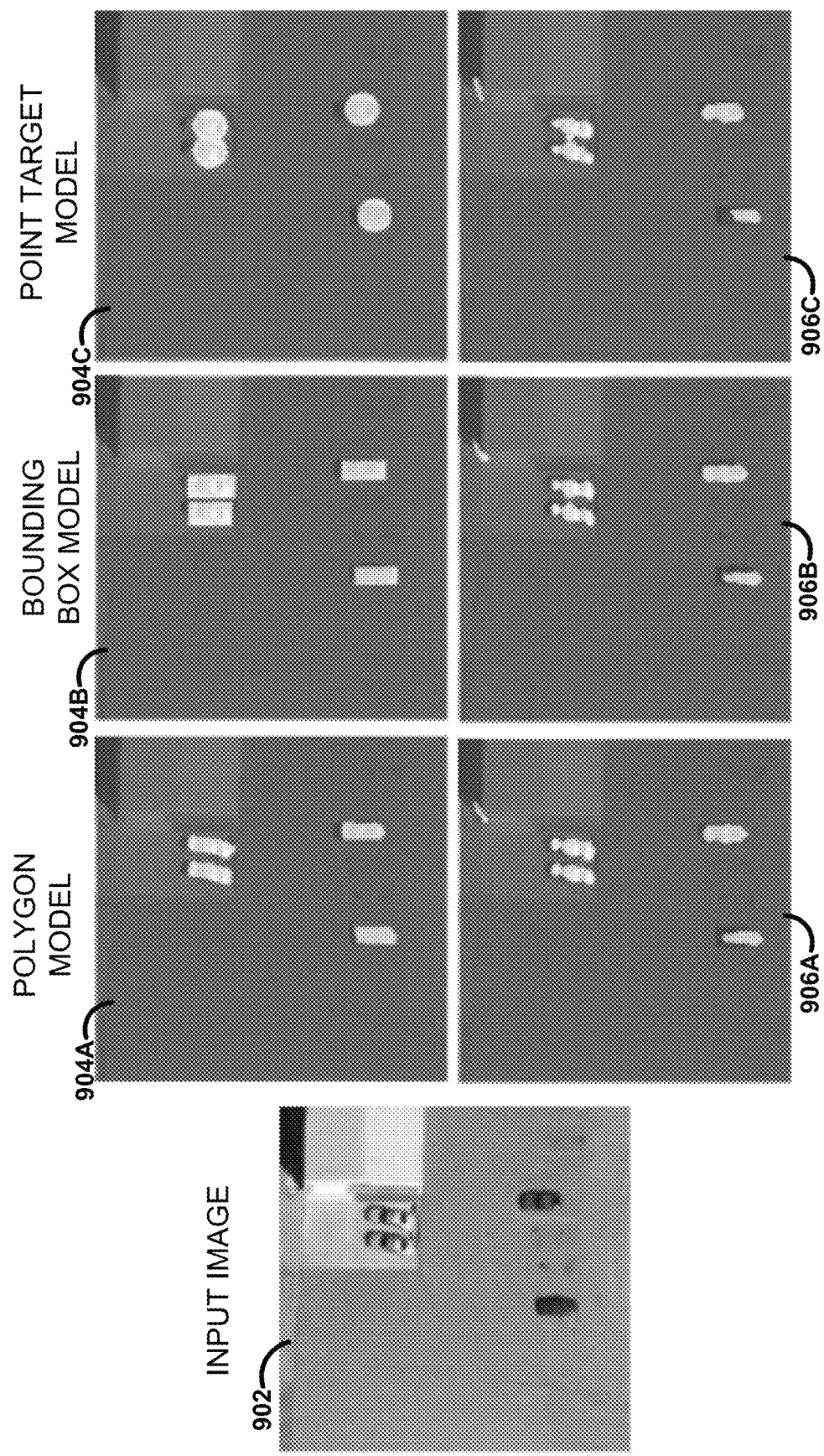
FIG. 9 illustrates, by way of example, a diagram of an embodiment of an input image, a corresponding mask for each ML model, and output generated by the respective ML models.
Figure 10:
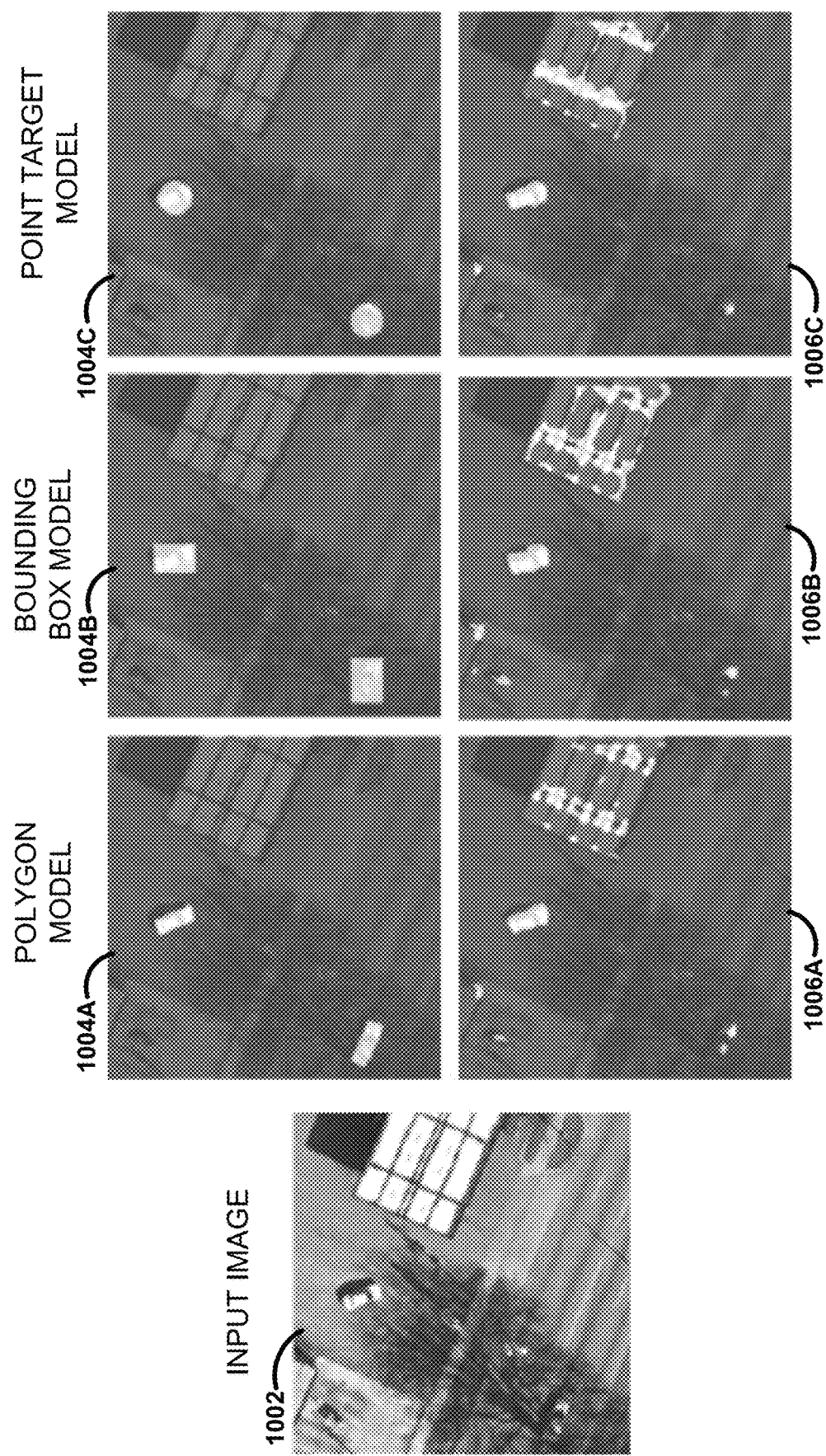
FIG. 10 illustrates, by way of example, a diagram of an embodiment of model output detection with an occluded target and a false positive detection.

When analyzed qualitatively, the similarities between the three networks, regardless of the type of data trained on, become even more apparent. FIGS. 9 and 10 exhibit some examples of the outputs of these networks.

FIG. 9 illustrates, by way of example, a diagram of an embodiment of an input image 902, a corresponding mask 904A, 904B, 904C for each ML model, and output 906A, 906B, 906C generated by the respective ML models.

When looking at the model output 906A-906C masks alone, it is very difficult to discern any clear differences between the three models. In FIG. 9, all of the targets are captured effectively by each model. There is little presence of "boxiness" with the bounding box network detections and similarly, no indication of circles in the point target network.

There was a general increase in false positive detections for the bounding box and point target models relative to the polygon model. While all three models showed false positive detections at similar locations, the detection area for these false positives was typically larger for the bounding box and point target models than for the polygon model. An example is presented in FIG. 10.

FIG. 10 illustrates, by way of example, a diagram of an embodiment of model output detection with an occluded target and a false positive detection. An input image 1002, the polygon model output, bounding box model output, and point target model output are presented from left to right. Masks 1004A, 1004B, 1004C and detected targets 1006A, 1006B, 1006C are provided for each model type.

Comparing annotation types can be a beneficial step when assembling a dataset for ML model applications. Embodiments provide a sample methodology to perform these comparisons, which may be expanded or adapted for other use cases. The quantitative results show that all three of these networks do a remarkably similar job on the detection task with the polygon trained network exhibiting only marginally better performance than the bounding box trained network and the point target trained network. This evidence supports the consideration of bounding boxes or centroids for annotations instead of polygons for cost savings. A result of embodiments is that the bounding boxes and point targets perform better compared when evaluated with polygons than with their own masks shows that the mislabeled pixels do not cause the network to learn incorrect shapes of objects, but that the system still generally learns to paint the objects correctly. This indicates that annotation type may not be as important as previously thought in some cases. It may be appropriate to consider the difference between these annotation types in terms of label noise, where some pixels in each bounding box or point target annotation are incorrectly labeled. A noise model, such as those previously discussed can generate a pseudolabel to overcome a deficiency of an annotation type.

While embodiments used the polygons, bounding boxes, and centroids as annotation types of interest, the choice of annotation type can be tailored to a particular application. Similarly, network architecture and evaluation metrics can be based on the application and type of data in use. The selection of the Overfeat network architecture and the area under the ROC curve metric may not be the best options for all use cases.

Figure 11:
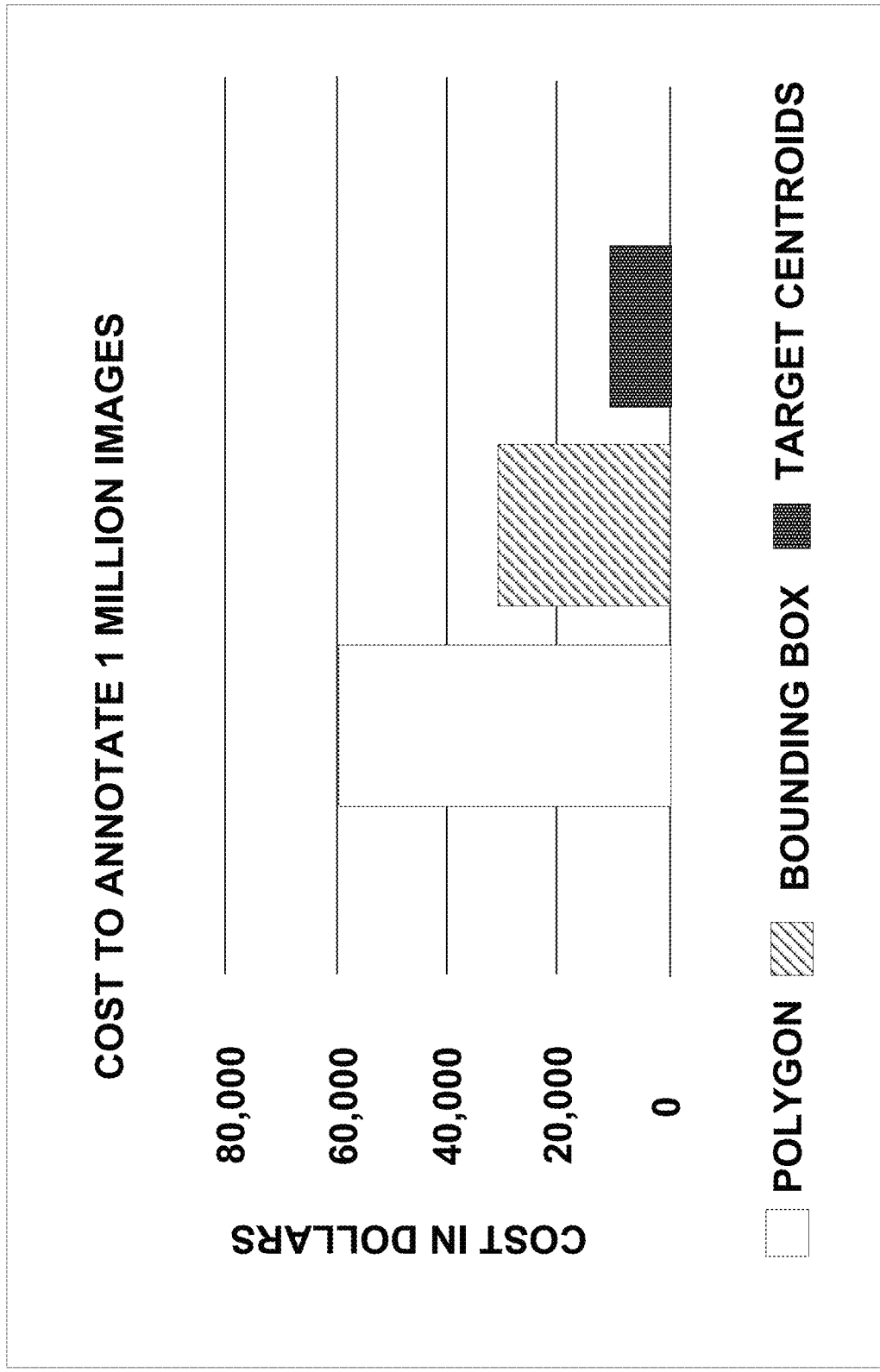
FIG. 11 illustrates, by way of example a diagram of an embodiment of a bar graph of cost differences between annotation types.

Overall, embodiments show a clear method for evaluating and improving ML datasets, such as prior to paying for the annotation of the dataset. This will allow saving considerable amounts of money or alternatively annotating significantly more data with the same amount of money. For example, annotating IM images with polygons at $0.06/polygon would cost $60K vs. $0.01/centroid at a cost of $10K. FIG. 11 illustrates, by way of example a diagram of an embodiment of a bar graph of cost differences between annotation types. Embodiments can empower researchers and others to consider the annotation task as less daunting and allow them to continue exploring new and exciting use cases.

There are a number of ways that embodiments can be expanded to provide more insight and better cost analysis for annotation types. Additional point or bounding box labels can provide the same performance as polygons. Embodiments can be extended using additional bounding box and point target data to fill performance gaps present with the polygon trained network. If so, a definitive cost analysis can identify the lowest-cost annotation type for a given detection performance. This might support the potential for researchers to purchase more data with their budgets instead of the polygon annotations.

Additionally, more diverse datasets with targets of other shapes, as well as other annotation types can be used in embodiments. The OIRDS is a relatively small dataset, with the potential to create bias in the investigation based on the lack of diversity. A similar or different data set can be used. One specific annotation type that can be used in embodiments is an ellipse. Ellipses can provide more fidelity than point targets or bounding boxes while taking a similar amount of time to annotate as a bounding box.

Model selection and tuning can be expanded by selecting different models and tuning them specifically for the annotation type in embodiments. Implementing models designed to be fully convolutional can produce improved results as they are designed to produce pixel level output. Regularization and kernel sizes are examples of parameters that can potentially be tuned on the networks to help compensate for the variations between the data types.

In some embodiments, a precision recall curve can be used in addition or alternative to the ROC or AuC. The precision recall curve can be better suited than ROC curves for evaluating detection of objects vs. pixels. Evaluating a more complete and diverse set of metrics can provide a larger and less biased picture of the strengths and weaknesses of different annotation options, providing a better basis for decisions about which annotation type to select for a given dataset.

Figure 12:
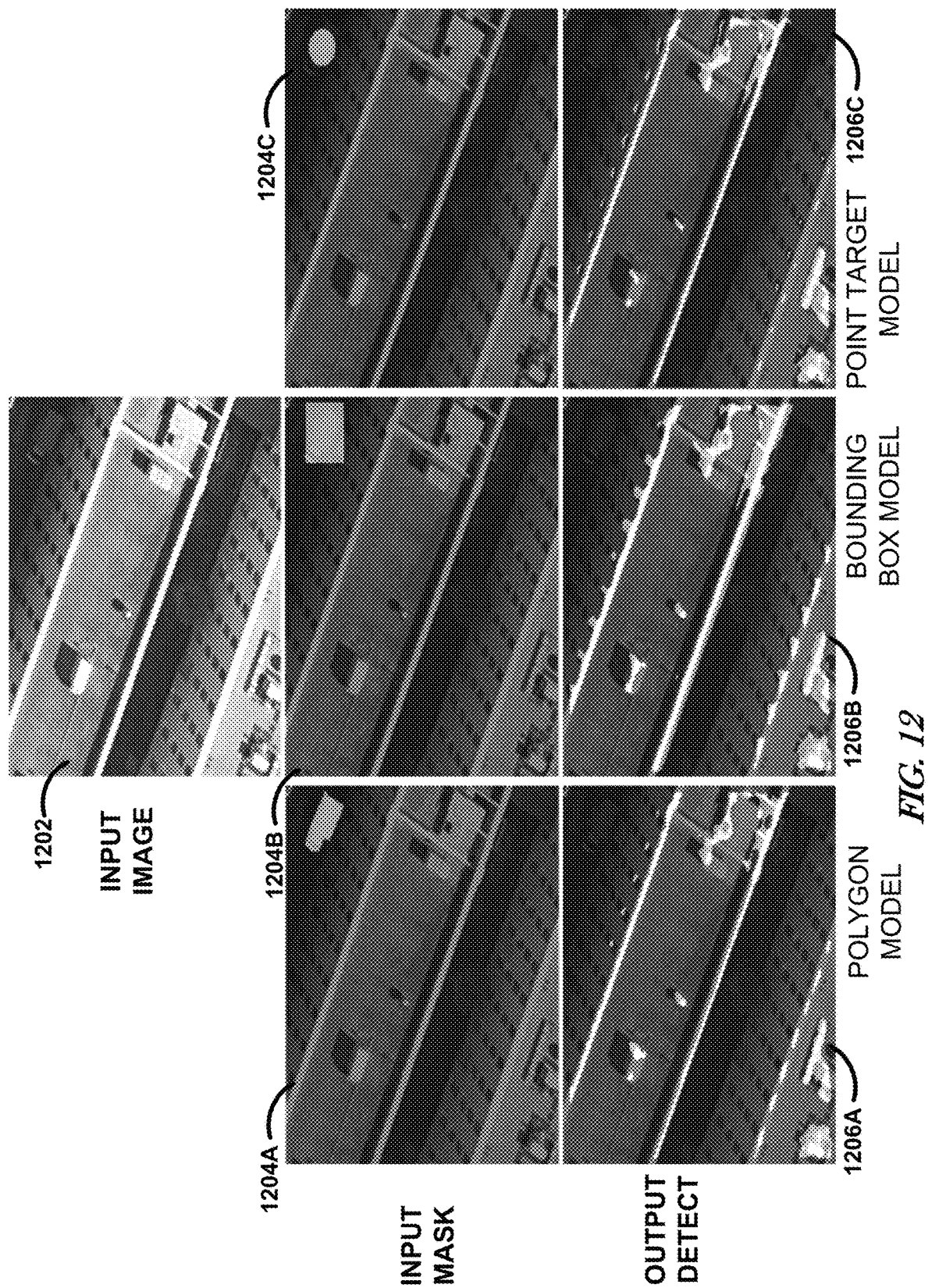
FIG. 12 illustrates, by way of example, a diagram of an embodiment of model output detection with false positive detection

FIG. 12 illustrates, by way of example, a diagram of an embodiment of model output detection with false positive detection. From left to right, the polygon model, bounding box model, and point target model. An input image 1202 is provided to each model. Each model is also provided or produces an input mask 1204A, 1204B, 1204C. The output detected 1206A, 1206B, 1206C is also provided.

Figure 13:
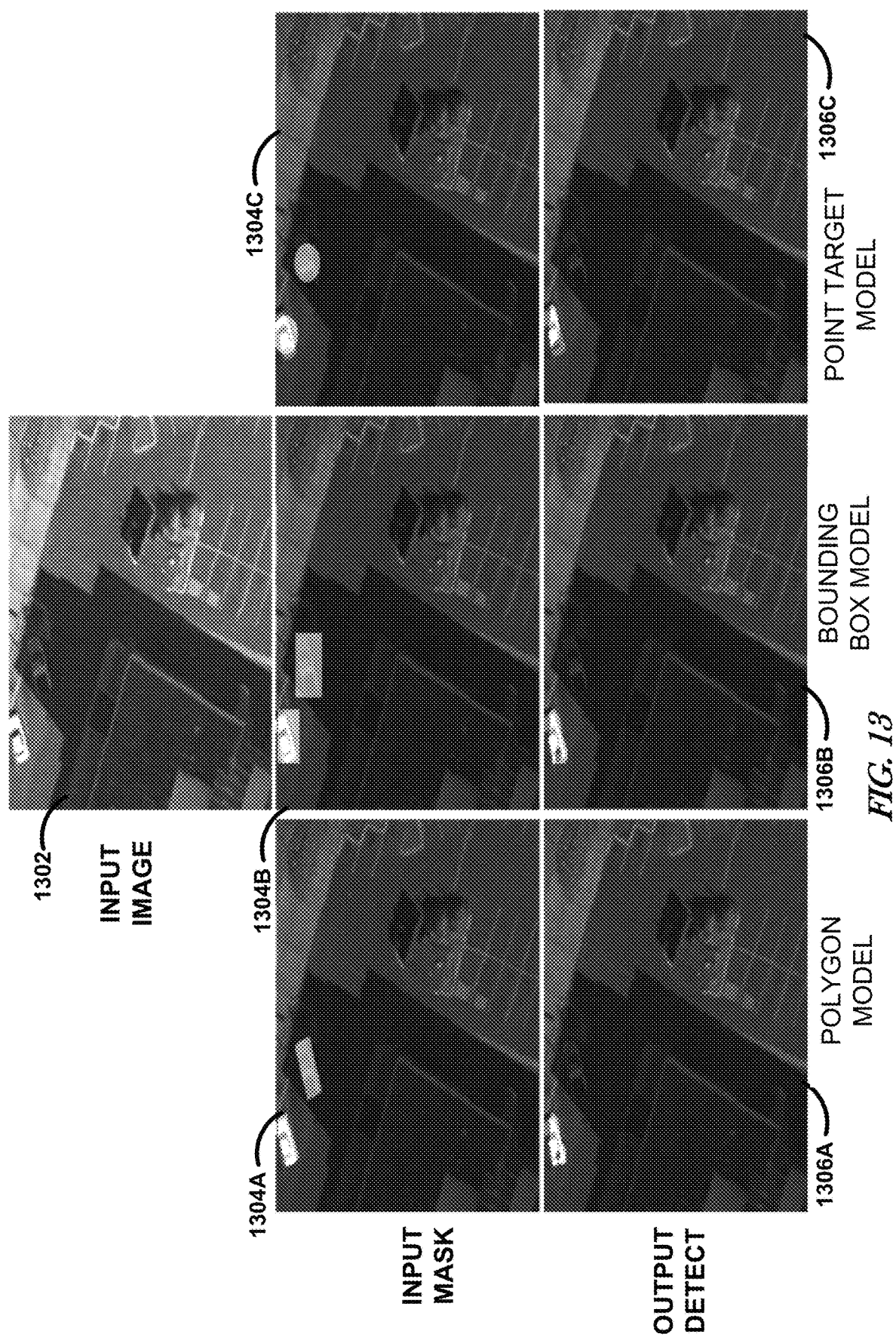
FIG. 13 illustrates, by way of example, a diagram of an embodiment of model output detection with missed detection.

FIG. 13 illustrates, by way of example, a diagram of an embodiment of model output detection to illustrate a weakness of embodiments. From left to right, the polygon model, bounding box model, and point target model. An input image 1302 is provided to each model. Each model is also provided or produces an input mask 1304A, 1304B, 1304C. The output detected 1306A, 1306B, 1306C is also provided.

In short summary, embodiments can begin with data trained on each annotation type of interest, training a model (e.g., NN) on each annotation type (e.g., Polygons, Bounding Boxes, Point Targets), and evaluate using a metric (e.g., ROC Curve or precision recall curve). This allows for quantitative evaluation of the annotation types that can be used in conjunction with costs to provide a cost vs performance analysis. Embodiment can thus evaluate and compare the effects of a data annotation type on the performance of a model, such as for use in cost analysis (any type of annotation with any type of neural network and with any metric). Embodiments can thus provide an automated method of taking data annotated with polygons and testing the effect of the three main annotation types on the performance of a model using the Overfeat network architecture and the ROC curve AUC metric or other metric.

Embodiments can extrapolate Bounding Boxes and Point Targets from polygons, feeding into and training individual DNNs and then analyzing the results by producing ROCs. Overfitting can be an issue present in a "noisy" dataset variants. Comparing annotations after custom regularization can have a large effect on network efficacy. Embodiments can benefit from tuning kernels or other network components to help compensate for data.

Figure 14:
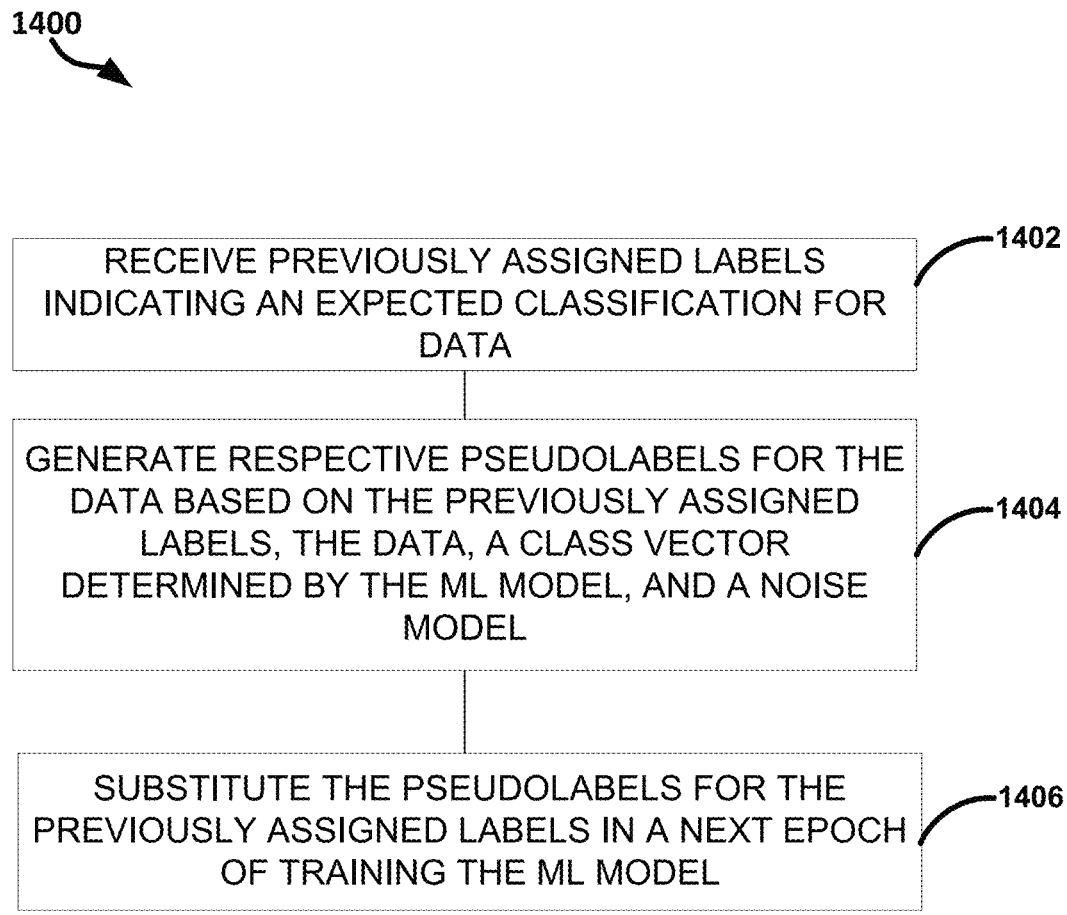
FIG. 14 illustrates, by way of example, a diagram of an embodiment of a method for informed pseudolabel generation.

FIG. 14 illustrates, by way of example, a diagram of an embodiment of a method 1400 of training a machine learning (ML) model using informed pseudolabels. The method 1400 can be performed by circuitry configured to implement the pseudolabel generator 112. The method 1400 as illustrated includes receiving previously assigned labels indicating an expected classification for data, the labels having a specified uncertainty, at operation 1402; generating respective pseudolabels for the data based on the previously assigned labels, the data, a class vector determined by an ML model, and a noise model indicating, based on the specified uncertainty, a likelihood of the previously assigned label given the class, at operation 1404; and substituting the pseudolabels for the previously assigned labels in a next epoch of training the ML model, at operation 1406.

The method 1400 can further include, wherein generating the respective pseudolabel includes determining, for each class, a probability of the class given the data. The method 1400 can further include, wherein generating the respective pseudolabel includes determining, for each label, a probability of the label given the class. The method 1400 can further include, wherein generating the respective pseudolabel includes determining a class label associated with a probability based on a combination of the determined probability of the class given the data and the determined probability of the label given the class.

The method 1400 can further include, wherein the combination includes a multiplication of probabilities or an addition of log probabilities. The method 1400 can further include, wherein the class associated with the combination having a highest value is provided as the pseudolabel. The method 1400 can further include, wherein the noise model indicates, for each label and class combination a probability that the label is erroneously associated with the data when the class is the proper label.

Figure 15:
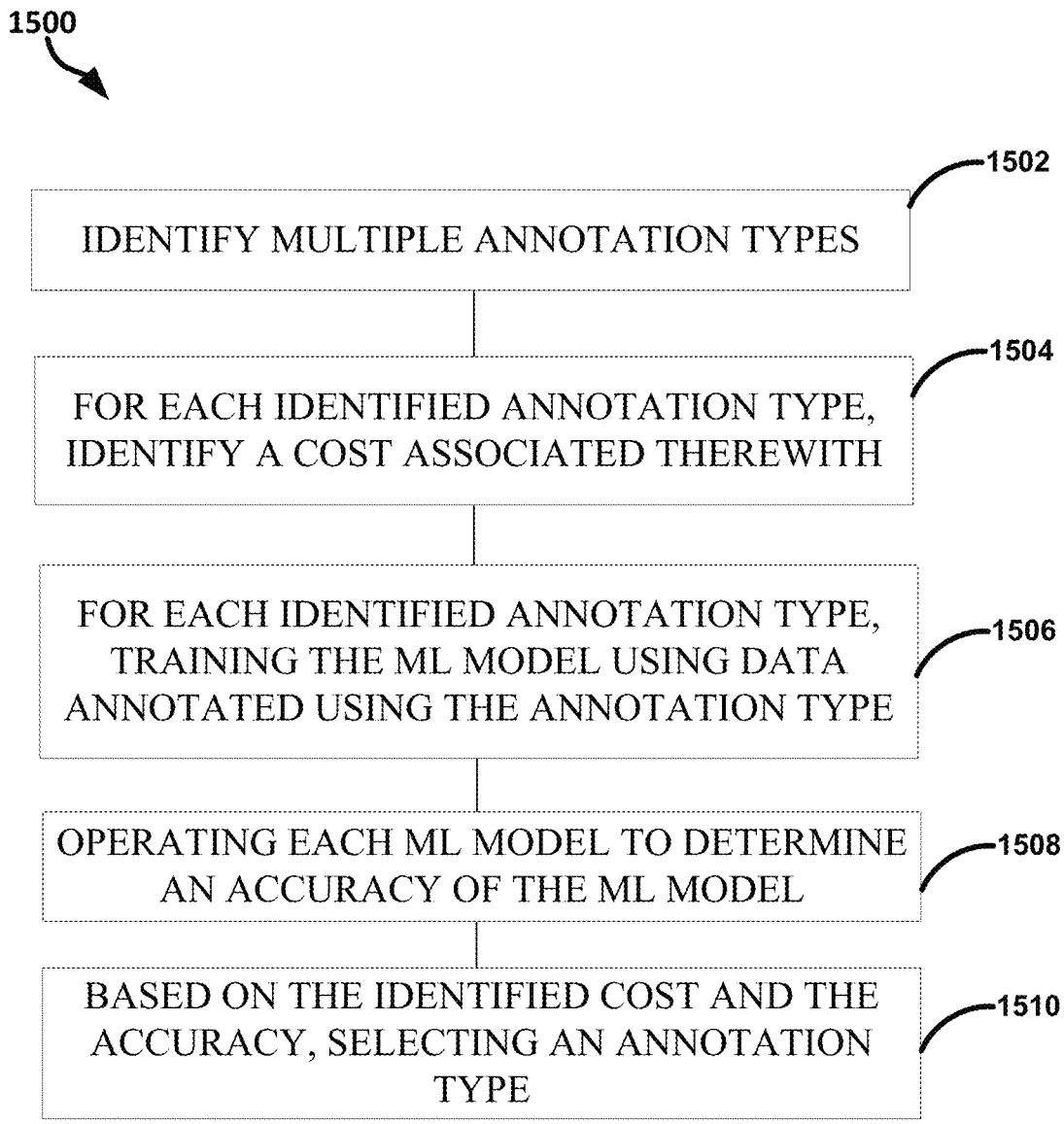
FIG. 15 illustrates, by way of example, a diagram of an embodiment of a method for ML annotation type selection.

FIG. 15 illustrates, by way of example, a diagram of an embodiment of a method 1500 of identifying an annotation type for a machine learning (ML) technique for classifying data. The method 1500 as illustrated includes identifying multiple annotation types, at operation 1502; for each annotation type of the annotation types, identifying a cost associated therewith, at operation 1504; for each annotation type of the annotation types, training the ML model using data annotated using the annotation type, at operation 1506; operating each ML model to determine an accuracy of the ML model, at operation 1508; and based on the identified cost and the accuracy, selecting an annotation type, at operation 1510.

The method 1500 can further include, wherein the annotation types include two or more of bounding boxes, polygons, point targets, and ellipses. The method 1500 can further include, wherein accuracy is determined based on a receiver operating characteristic curve of the output. The method 1500 can further include, wherein accuracy is further determined based on area under the ROC curve.

The method 1500 can further include, wherein accuracy is determined based on a precision recall curve. The method 1500 can further include, wherein accuracy is further determined based on area under the precision recall curve. The method 1500 can further include, wherein the cost includes time to annotate, monetary cost to annotate, and time to train using the annotation type of the annotation types.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program may be written in any form of programming language, including compiled or interpreted languages, and it may be deployed in any form, including as a stand-alone program or as a module, subroutine, or other unit suitable for use in a computing environment. A computer program may be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations may also be performed by, and apparatus of example embodiments may be implemented as, special purpose logic circuitry, e.g., a field programmable gate array (FPGA) or an application-specific integrated circuit (ASIC).

The computing system may include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium (e.g., Storage Device)

Figure 16:
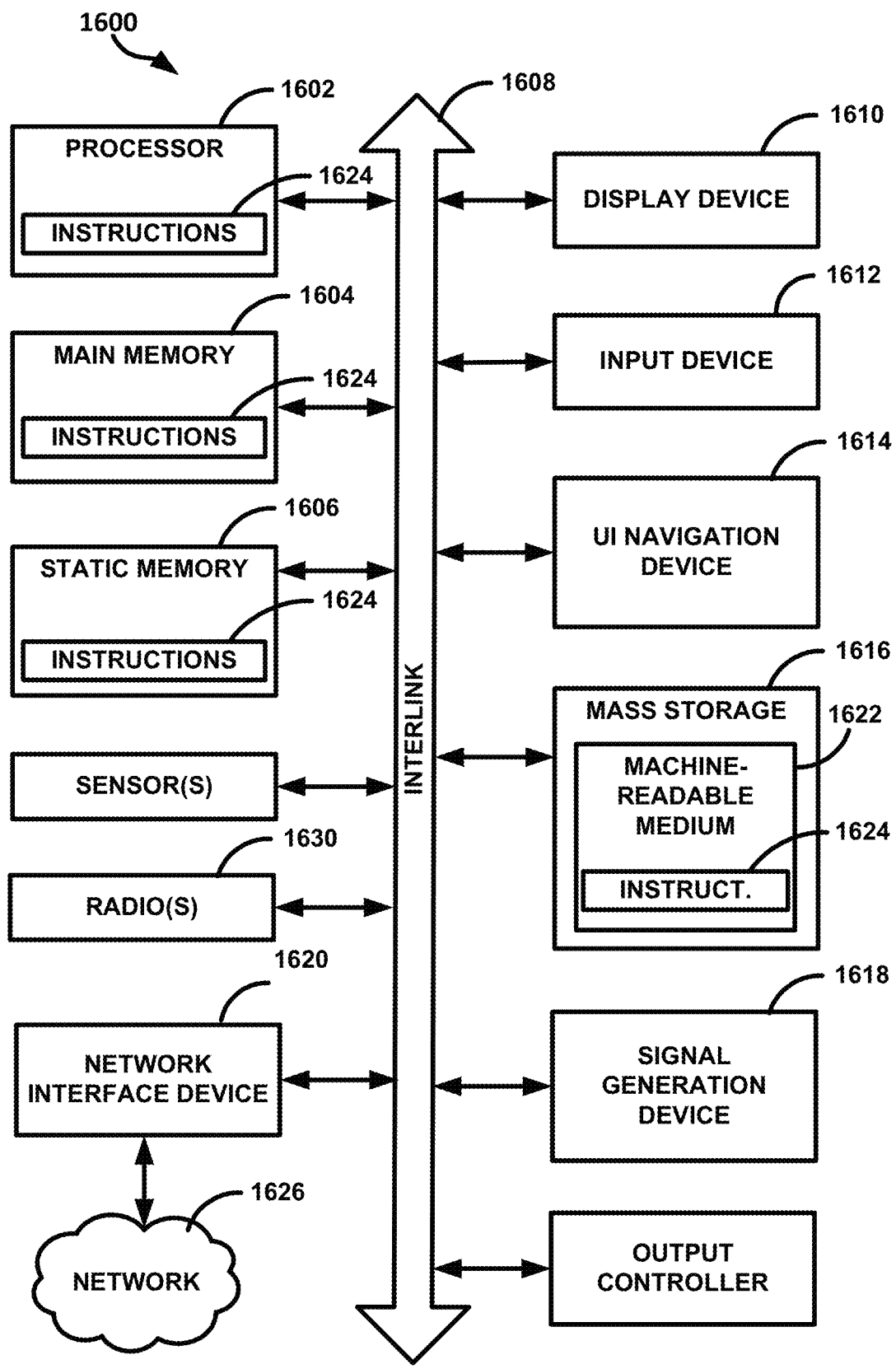
FIG. 16 illustrates, by way of example, a block diagram of an embodiment of a machine in the example form of a computer system within which instructions, for causing the machine to perform any one or more of the methodologies discussed herein, may be executed.

FIG. 16 illustrates, by way of example, a block diagram of an embodiment of a machine in the example form of a computer system 1600 within which instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1600 includes a processor 1602 (e.g., processing circuitry, such as can include a central processing unit (CPU), a graphics processing unit (GPU), field programmable gate array (FPGA), other circuitry, such as one or more transistors, resistors, capacitors, inductors, diodes, regulators, switches, multiplexers, power devices, logic gates (e.g., AND, OR, XOR, negate, etc.), buffers, memory devices, or the like, or a combination thereof), a main memory 1604 and a static memory 1606, which communicate with each other via a bus 1608. The computer system 1600 may further include a video display unit 1610 (e.g., a liquid crystal display (LCD) or a cathode ray tube (CRT)). The computer system 1600 also includes an alphanumeric input device 1612 (e.g., a keyboard), a user interface (UI) navigation device 1614 (e.g., a mouse), a disk drive unit 1616, a signal generation device 1618 (e.g., a speaker), a network interface device 1620, and radios 1630 such as BLUETOOTH®, WWAN, WLAN, and NFC, permitting the application of security controls on such protocols.

Machine-Readable Medium

The disk drive unit 1616 includes a machine-readable medium 1622 on which is stored one or more sets of instructions and data structures (e.g., software) 1624 embodying or utilized by any one or more of the methodologies or functions described herein. The instructions 1624 may also reside, completely or at least partially, within the main memory 1604 and/or within the processor 1602 during execution thereof by the computer system 1600, the main memory 1604 and the processor 1602 also constituting machine-readable media.

While the machine-readable medium 1622 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1624 may further be transmitted or received over a communications network 1626 using a transmission medium. The instructions 1624 may be transmitted using the network interface device 1620 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Additional Notes and Example Embodiments

Example 1 includes a method of identifying a machine learning (ML) technique for classifying data, the technique comprising identifying multiple annotation types, for each annotation type of the annotation types, identifying a cost associated therewith, for each annotation type of the annotation types, training the ML model using data annotated using the annotation type, operating each ML model to determine an accuracy of the ML model, and based on the identified cost and the accuracy, selecting an annotation type.

In Example 2, Example 1 further includes, wherein the annotation types include two or more of bounding boxes, polygons, point targets, and ellipses.

In Example 3, at least one of Examples 1-2 further includes, wherein accuracy is determined based on a receiver operating characteristic curve of the output.

In Example 4, Example 3 further includes, wherein accuracy is further determined based on area under the ROC curve.

In Example 5, at least one of Examples 1-4 further includes, wherein accuracy is determined based on a precision recall curve.

In Example 6, Example 5 further includes, wherein accuracy is further determined based on area under the precision recall curve.

In Example 7, at least one of Examples 1-6 further includes, wherein the cost includes time to annotate, monetary cost to annotate, and time to train using the annotation type of the annotation types.

Example 8 includes a method of training a machine learning (ML) model using informed pseudolabels, the method performed by circuitry configured to implement a pseudolabel generator, the method comprising receiving previously assigned labels indicating an expected classification for data, the labels having a specified uncertainty, generating respective pseudolabels for the data based on the previously assigned labels, the data, a class vector determined by an ML model, and a noise model indicating, based on the specified uncertainty, a likelihood of the previously assigned label given the class, and substituting the pseudolabels for the previously assigned labels in a next epoch of training the ML model.

In Example 9, Example 8 further includes, wherein generating the respective pseudolabel includes determining, for each class, a probability of the class given the data.

In Example 10, Example 9 further includes, wherein generating the respective pseudolabel includes determining, for each label, a probability of the label given the class.

In Example 11, Example 10 further includes, wherein generating the respective pseudolabel includes determining a class label associated with a probability based on a combination of the determined probability of the class given the data and the determined probability of the label given the class.

In Example 12, Example 11 further includes, wherein the combination includes a multiplication of probabilities or an addition of log probabilities.

In Example 13, Example 12 further includes, wherein the class associated with the combination having a highest value is provided as the pseudolabel.

In Example 14, at least one of Examples 8-13 further includes, wherein the noise model indicates, for each label and class combination a probability that the label is erroneously associated with the data when the class is the proper label.

Example 15 includes a system comprising a memory including parameters defining an ML model and processing circuitry to implement the method of at least one of Examples 1-14

Example 16 includes a non-transitory machine-readable medium including instructions that, when executed by a machine, cause the machine to perform the method of at least one of Examples 1-14.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method of training a machine learning (ML) model using informed pseudolabels, the method performed by circuitry configured to implement a pseudolabel generator, the method comprising:
   receiving previously assigned labels indicating an expected classification for data, the labels generated by a partially trained ML model in an immediately previous training epoch and the labels having a specified uncertainty;
   generating the informed pseudolabels for the data based on a mathematical combination of (i) a first probability of the previously assigned labels given a class vector determined by the partially trained ML model, and (ii) a second probability of the class vector determined by the partially trained ML model given the data; and
   training, by substituting the informed pseudolabels for the previously assigned labels in a next epoch of training, the partially trained ML model resulting in the ML model.

2. The method of claim 1, wherein generating the informed pseudolabels further includes using the specified uncertainty from a noise model that indicates a likelihood of the previously assigned label being correct, to determine the first probability.

3. The method of claim 2, wherein a class of the class vector associated with the mathematical combination having a highest value is provided as the pseudolabel of the informed pseudolabels.

4. The method of claim 2, wherein the noise model indicates, for each label and class combination, a probability that the label is erroneously associated with the data when the class is a proper label.

5. A system for training a machine learning (ML) model using informed pseudolabels, the system comprising:
   a memory to store parameters defining the ML model; and
   processing circuitry to:
   receive previously assigned labels indicating an expected classification for data, the labels generated by a partially trained ML model in an immediately previous training epoch and the labels having a specified uncertainty;
   generate the informed pseudolabels for the data based on a mathematical combination of (i) a first probability of the previously assigned labels given a class vector determined by the partially trained ML model, and (ii) a second probability of the class vector determined by the partially trained ML model given the data; and
   training, with substitution of the informed pseudolabels for the previously assigned labels in a next epoch of training, the partially trained ML model resulting in the ML model.

6. The system of claim 5, wherein generating the informed pseudolabels further includes using, to determine the first probability, the specified uncertainty from a noise model that indicates; a likelihood of the previously assigned label given the class.

7. The system of claim 5, wherein the ML model is a segmentation model that classifies image pixels, the previously assigned labels are one of bounding boxes, ellipses, point targets, and polygons for target objects represented in images.

8. A non-transitory machine-readable medium including instructions that, when executed by a machine, cause the machine to perform operations for training a machine learning (ML) model using informed pseudolabels, the operations comprising:
   receiving previously assigned labels indicating an expected classification for data, the labels generated by a partially trained ML model in an immediately previous training epoch and the labels having a specified uncertainty;
   generating the informed pseudolabels for the data based on a mathematical combination of (i) a first probability of the previously assigned labels given a class vector determined by a partially trained ML model, and (ii) a second probability of the class vector determined by the partially trained ML model given the data; and training, with substitution of the informed pseudolabels for the previously assigned labels in a next epoch of training, the partially trained ML model resulting in the ML model.

9. A system for selecting an annotation type for use in annotating data for use in training a machine learning (ML) model, the system comprising:
a memory to store parameters defining the ML model; and
processing circuitry to:
identify multiple manual image annotation types;
for each annotation type of the manual image annotation types, identify a cost associated therewith;
for each annotation type of the manual image annotation types, training the ML model using data annotated using the annotation type resulting in trained ML models, training the ML model including generating informed pseudolabels for the data based on a mathematical combination of (i) a first probability of previously assigned labels given a class vector determined by a partially trained version of the ML model, and (ii) a second probability of the class vector determined by the partially trained version of the ML model given the data;
operate each of the trained ML models to determine respective accuracies of the trained ML models; and
based on the identified cost and an accuracy of the respective accuracies, select an annotation type of the multiple manual image annotation types.

10. The system of claim 9, wherein:
the manual image annotation types include bounding boxes and point targets extrapolated from provided polygons;
the respective accuracies are determined based on a receiver operating characteristic curve of the output; and
the cost includes time to annotate, monetary cost to annotate, and time to train using the annotation type of the manual image annotation types.

* * * * *